United States Patent
Yaqub

(10) Patent No.: US 10,776,591 B1
(45) Date of Patent: Sep. 15, 2020

(54) DATA-SECURING CHIP CARD CONSTRUCTION

(71) Applicant: Wells Fargo Bank, N.A., San Francisco, CA (US)

(72) Inventor: Raziq Yaqub, Stewartsville, NJ (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

(21) Appl. No.: 16/723,426

(22) Filed: Dec. 20, 2019

Related U.S. Application Data

(62) Division of application No. 15/860,477, filed on Jan. 2, 2018.

(60) Provisional application No. 62/591,606, filed on Nov. 28, 2017.

(51) Int. Cl.
  *G06K 7/10* (2006.01)
  *G06K 19/077* (2006.01)

(52) U.S. Cl.
  CPC ... *G06K 7/10366* (2013.01); *G06K 19/07773* (2013.01)

(58) Field of Classification Search
  CPC .................. G06K 7/10366; G06K 19/07773
  See application file for complete search history.

(56) References Cited

U.S. PATENT DOCUMENTS

| | | | |
|---|---|---|---|
| 6,512,482 B1 | 1/2003 | Nelson et al. | |
| 7,954,722 B2 | 6/2011 | Sakama | |
| 8,322,624 B2 | 12/2012 | Finn | |
| 8,886,119 B2 | 11/2014 | Posch et al. | |
| 8,937,531 B2 | 1/2015 | Rimai et al. | |
| 9,183,487 B2 | 11/2015 | Aiyer et al. | |
| 9,292,875 B1 | 3/2016 | Candelore et al. | |

(Continued)

FOREIGN PATENT DOCUMENTS

| | | |
|---|---|---|
| KR | 20040025318 A | 3/2004 |
| KR | 10-1003827 A | 4/2010 |

(Continued)

OTHER PUBLICATIONS

Khedekar., "'On' and 'Off' switch design to avoid credit card RFID and NFC theft," accessed from http://www.firstpost.com/tech/news-analysis/on-and-off-switch-design-to-avoid-credit-card-rfid-and-nfc-theft-3594761.html, Feb. 20, 2012, 2 pp.

(Continued)

*Primary Examiner* — Sonji N Johnson
(74) *Attorney, Agent, or Firm* — Shumaker & Sieffert P.A.

(57) ABSTRACT

A card may store data on integrated circuits housed within the card. The card includes two short-range antennas and one long-range antenna that are configured to transmit the data. Antennas of the card may be configured to transmit the data in different directions as a result of a signal-blocking layer embedded within the card that isolates respective antennas from electromagnetic signals originating from a direction on the opposing side of the blocking layer. The long-range antenna may be configured to transmit identification data of the user, while the short-range antennas may be configured to transmit financial data related to the user. A system may be configured to instantiate events for the user of the card with the long-range antenna. Events that are instantiated by the long-range antenna may then be executed using the short-range antennas.

20 Claims, 8 Drawing Sheets

(56) References Cited

U.S. PATENT DOCUMENTS

| | | | |
|---|---|---|---|
| 9,622,555 | B2 | 4/2017 | Kopel et al. |
| 9,626,673 | B2 | 4/2017 | He et al. |
| 9,697,539 | B2 | 7/2017 | Emigh et al. |
| 10,438,032 | B1 | 10/2019 | Yaqub |
| 2004/0019564 | A1 | 1/2004 | Goldthwaite et al. |
| 2008/0035725 | A1 | 2/2008 | Jambunathan et al. |
| 2012/0286928 | A1 | 11/2012 | Mullen et al. |
| 2013/0225079 | A1* | 8/2013 | Ashour ............ G06K 19/07771 455/41.2 |
| 2014/0070010 | A1 | 3/2014 | Diorio et al. |
| 2014/0214674 | A1 | 7/2014 | Narula |
| 2015/0069132 | A1* | 3/2015 | Pueschner ........ G06K 19/07747 235/488 |
| 2016/0050202 | A1 | 2/2016 | Swallow |
| 2016/0224975 | A1 | 8/2016 | Na et al. |

FOREIGN PATENT DOCUMENTS

| | | |
|---|---|---|
| TW | 201104580 A | 2/2011 |
| WO | 2012019239 A1 | 2/2012 |
| WO | 2016157037 A1 | 10/2016 |

OTHER PUBLICATIONS

Roland et al., "Evaluation of Contactless Smartcard Antennas," Technical Report, University of Applied Sciences, Jun. 11, 2015, 29 pp.

Wells Fargo, "University of Florida gator 1 Card," accessed from https://www.wellsfargo.com/debit-card/campus-card/fiu/ on Jun. 2017, 2 pp.

Noyes., "RFID Credit Cards are Easy Prey for Hackers, Demo Shows," Security Alert, accessed from https://www.pcworld.com/article/249138/rfid_credit_cards_are_easy_prey_for_hackers_demo_shows.html, Feb. 1, 2012, 3 pp.

"About RFID," Rogue Industries, accessed from https://www.rogue-industries.com/pages/walletguard-rfid-blocking on Mar. 30, 2017.

Greenberg, "Hacker's Demo Shows How Easily Credit Cards Can Be Read Through Clothes and Wallets," Forbes Online, Jan. 30, 2012, 6 pp.

NANA31, "Will a layer of aluminum foil lining a wallet protect credit cards from theft of information by RFID reader? Want to advise friends too." Posted to Angie's List online, asked Sep. 29, 2011.

"Card-Not-Present Fraud: A Primer on Trends and Transaction Authentication Processes," EMV Connection, Payments Council,Feb. 2014, 21 pp.

PYMNTS, "Card-Not-Present Fraud Picking Up In US," Security & Fraud from PYMNTS Online, accessed from https://www.pymnts.com/news/security-and-risk/2017/card-not-present-fraud-picking-up-in-us/, Jan. 18, 2017.

Aitken, "U.S. Card Fraud Losses Could Exceed $12B by 2020," Forbes Online, Oct. 26, 2016, accessed from https://www.forbes.com/sites/rogeraitken/2016/10/26/us-card-fraud-losses-could-exceed-12bn-by-2020/#579b45c4d243, 2 pp.

IP Tracker, "IP Locator also known as IP Lookup Tool," accessed from http://www.ip-tracker.org/locator/ip-lookup.php, 3 pp.

Office Action from U.S. Appl. No. 16/592,350, dated Dec. 12, 2019, 5 pp.

Youtube, "Simple RFID hack—Digial Pocket Picking," WTVOX Fashion Innovation Magazine, https://www.youtube.com/watch?v=SPiyftJZ9jo&t=87s, posted Aug. 4, 2015.

Notice of Allowance from U.S. Appl. No. 15/860,456, dated May 30, 2019, 8 pp.

Office Action from U.S. Appl. No. 15/860,456, dated Dec. 7, 2018, 6 pp.

Response to Office Action dated Dec. 7, 2018, from U.S. Appl. No. 15/860,456, filed Mar. 7, 2019, 6 pp.

Notice of Allowance from U.S. Appl. No. 15/860,477 dated Mar. 18, 2020 8 pp.

Response to Office Action dated Dec. 12, 2019, from U.S. Appl. No. 16/592,316, filed Feb. 28, 2020, 2 pp.

Response to Office Action dated Dec. 12, 2019, from U.S. Appl. No. 16/592,350, filed Feb. 28, 2020, 2 pp.

Office Action from U.S. Appl. No. 16/592,316, dated Dec. 12, 2019, 5 pp.

Notice of Allowance from U.S. Appl. No. 16/592,350, dated Jul. 10, 2020, 7 pp.

Notice of Allowance from U.S. Appl. No. 16/592,316, dated Jul. 13, 2020, 7 pp.

* cited by examiner

DATA-SECURING CHIP CARD CONSTRUCTION

This application is a division of U.S. patent application Ser. No. 15/860,477, filed on Jan. 2, 2018, which claims the benefit of U.S. Provisional Application Ser. No. 62/591,606, filed on Nov. 28, 2017, the entire contents of each of which are incorporated herein by reference.

TECHNICAL FIELD

The invention relates to integrated circuit chip cards and methods for securing the same.

BACKGROUND

Credit cards have long provided card holders with a convenient payment option at a majority of merchants. Credit cards include unique information that links the card to a card holder's account with a financial institution (e.g., a bank or a non-bank card issuer). For example, in the case of a traditional credit card, the account may comprise an amount of credit available to the card holder, or in the case of a debit card, the account may comprise a checking or savings account that belongs to the card holder. Credit cards typically include the card holder's name, the account number, an expiration date, and a card security code (CSC) (alternatively referred to as a card verification value (CVV) or card verification code (CVC)) printed or embossed on the physical card.

Credit cards may also include a magnetic stripe or an integrated circuit (IC) that is attached to the physical card and encoded with the unique information. In the case of a chip-enabled card, the IC embedded on the card may be configured to store additional information and/or perform processing tasks that exceed the capabilities of a magnetic stripe. For example, a single chip-enabled card may be programmed with multiple financial account credentials, insurance information, and personal identification information. In other examples, these chip-enabled cards transmit data via one or more antennas embedded on the card. For example, the chip-enabled cards may transmit data via a short-range antenna or a long-range antenna on the card.

SUMMARY

In general, this disclosure describes techniques and systems that may increase the security and general ease of use of cards that store data on one or more integrated chips housed within the cards. According to the disclosed techniques, the card includes two or more antennas that are configured to transmit the data of the card. Antennas of the card may be configured to transmit the data in a different direction as a result of a signal-blocking layer embedded within the card that can isolate respective antennas from electro-magnetic signals originating from a direction on the opposing side of the blocking layer. The card may be configured to send a different set of data through different antennas. For example, the card may be configured to send a first set of data through a first antenna and a second set of data through a second antenna, where together the two sets of data can be used to execute a transaction. In use, a cardholder may hold the card in a first orientation relative to a stationary receiver to use the first antenna and therein transmit a first signal with the first set of data to the stationary receiver. After this, the cardholder may reposition the card to a second orientation relative to the stationary receiver to use the second antenna to transmit a second signal with the second set of data to the stationary receiver.

Aspects of this disclosure further relate to systems and techniques for authenticating the card. For example, an interrogating signal from the stationary receiver may include an authentication challenge for the card. The interrogating signal may be created for the card. The card may be configured to respond to the authentication challenge by transmitting an authentication factor that can be used to authenticate the card. For example, both the card and a secure server that is privately managed by a financial institution that manages the funds of the card may store a key or code that is unique to (and configured to not be transmitted by) the card. The stationary receiver may communicate with the secure server to verify that the card has successfully authenticated itself using the unique key or code. In response to this successful authentication, the stationary receiver may use data of the card to, e.g., execute a transaction.

Aspects of the disclosure further relate to the interplay of short-range and long-range antennas of the card. The short-range antennas may be secured to a first portion of the card while the long-range antenna may be secured to a second/different portion (e.g., a different side as viewed from a major surface) of the card. The signal-blocking layer may only extend across the first portion of the card such that the short-range antennas are substantially unidirectional and the long-range antenna is substantially omnidirectional. The long-range antenna of the card may have a relatively greater operational range than the short-range antennas of the card. In some examples, the long-range antenna may transmit a different set of data than the short-range antennas. The long-range antenna may be configured to transmit generic identification data of the cardholder, while the short-range antennas may be configured to transmit financial data related to the cardholder. A system may be configured to instantiate events, e.g., secure access, purchases, personalized messages and offers, for the cardholder of the card based on the identification data transmitted by the long-range antenna in advance of the cardholder arriving at the receiver to execute the events using the short-range antennas of the card.

In another example, this disclosure is directed to a system that includes a card that defines a first major surface and a second major surface, wherein the first major surface and second major surface are on opposing sides of the card. The system further includes a first integrated circuit secured to the card that stores a first set of identifying data as a first subset and a second subset. The system further includes a second integrated circuit secured to the card that stores a second set of identifying data. The system further includes a first short-range antenna secured to the card and electrically coupled to the first integrated circuit, wherein the first integrated circuit is configured to cause the first short-range antenna to transmit a first signal based on the first subset of the first set of identifying data through the first major surface in response to the first short-range antenna receiving a first interrogating electromagnetic signal. The system further includes a second short-range antenna secured to the card and electrically coupled to the first integrated circuit, wherein the first integrated circuit is configured to cause the second short-range antenna to transmit a second signal based on the second subset of the first set of identifying data through the second major surface in response to the second short-range antenna receiving a second interrogating electromagnetic signal. The system further includes a blocking layer that extends within a first portion of the card between the first major surface and the second major surface, wherein the blocking layer is configured to block electromagnetic signals between the first short-range antenna and the second short-range antenna. The system further includes a long-range antenna secured to the card at a second portion of the card that does not overlap with the first portion of the card, the long-range antenna electrically coupled to the second integrated circuit, wherein the second integrated circuit is configured to cause the long-range antenna to transmit a third signal based on the second set of identifying data in response to receiving a third interrogating electromagnetic signal.

In one example, this disclosure is directed to a computer-implemented method that includes receiving, by a roaming server, a set of identifying data in an encrypted format, wherein the set of identifying data relates to a cardholder of a card. The method further includes transmitting, by the roaming server, the set of identifying data in the encrypted format to an authentication server associated with the card. The method further includes receiving, by the roaming server and from the authentication server, the set of identifying data in a decrypted format. The method further includes analyzing the set of identifying data to determine identifying characteristics. The method further includes gathering, by the roaming server and from one or more data depositories, customization data that is related to the identifying characteristics. The method further includes creating, by the roaming server, a customized transaction. The method further includes using the customization data that includes a customized price and a customized message for the cardholder. The method further includes transmitting, by the roaming server to a merchant computing device, the customized transaction. The method further includes receiving, by the roaming server and from the merchant computing device, a first subset of financial information. The method further includes transmitting, by the roaming server to the authentication server, the first subset of financial information. The method further includes receiving, by the roaming server and from the authentication server, a variable to authenticate the card. The method further includes transmitting, by the roaming server and to the merchant computing device, the variable. The method further includes receiving, by the roaming server and from the merchant computing device, an authentication factor determined by the card using the variable. The method further includes transmitting, by the roaming server and to the authentication server, the authentication factor. The method further includes receiving, by the roaming server and from the authentication server, authentication results. The method further includes transmitting, by the roaming server and to the merchant device, the authentication results.

In a further example, this disclosure is directed to a system that includes a roaming server that includes a memory and a processor configured to transmit the set of identifying data in the encrypted format to an authentication server that is managed by a financial institution in response to determining that the set of identifying data is in an encrypted format. The processor may be further configured to analyze the set of identifying data to determine identifying characteristics in response to receiving the identifying data in a decrypted format from the authentication server. The processor may be further configured to gather customization data that is related to the identifying characteristics from one or more data repositories. The processor may be further configured to create a customized transaction using the customization data that includes customized pricing and a customized message. The processor may be further configured to transmit the customization data to at least one of an external computing device that transmitted the identifying data in the encrypted format to the roaming server or a merchant computing device that is configured to execute a transaction using funds managed by the financial institution. The processor may be further configured to transmit a first subset of financial data to the authentication server in response to determining that a first received message from the merchant computing device includes the first subset of financial data. The processor may be further configured to transmit a variable to the merchant device in response to determining that a second received message from the authentication server includes the variable. The processor may be further configured to transmit an authentication factor to the authentication server in response to determining that a third received message from the merchant computing device includes the authentication factor. The processor may be further configured to transmit authentication results to the merchant device in response to determining that a fourth received message from the authentication server includes the authentication results.

The details of one or more examples of the disclosure are set forth in the accompanying drawings and the description below. Other features, objects, and advantages of the disclosure will be apparent from the description and drawings, and from the claims.

DETAILED DESCRIPTION

Figure 1:
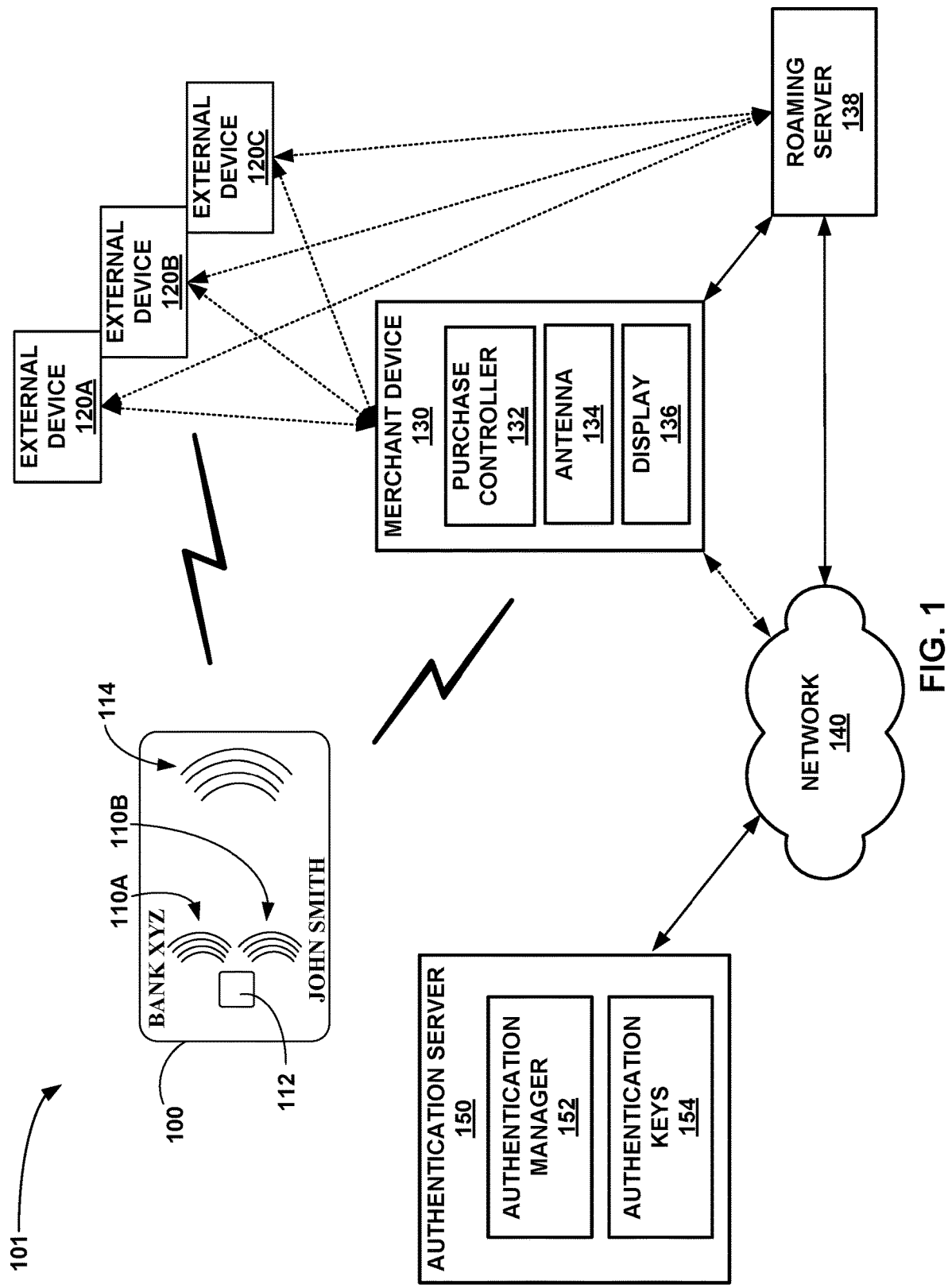
FIG. 1 is a block diagram illustrating a system that includes a card, external devices, a merchant device, a roaming server, and an authentication server, in accordance with the techniques of this disclosure.

Aspects of the disclosure are related to systems and methods for using a card that contains identifying information in a secured manner. The card includes one or more integrated circuits that store the identifying information. The identifying information may include financial information.

The card may be configured to transmit the identifying information using antennas embedded within the card. For example, the card may include two relatively short-range antennas. Using these antennas, the card may be configured to enable a user of the card (hereinafter referred to as a cardholder) to complete a financial transaction without having to physically swipe the card or even take the card out of a wallet. For example, the card may be used to complete a financial transaction by orienting the card within a certain proximity of a stationary receiver of a merchant device (e.g., a point-of-sale or POS device used by a merchant to execute and record transactions). The merchant device may be able to remotely activate and draw information from the card when the antennas of the card are properly oriented relative to the merchant device as described herein.

In some examples, malicious third parties may attempt to use the remotely activatable nature of the card to covertly activate and steal the information of the card. For example, a malicious third party may stand near a busy intersection with a near-field communication (NFC) enabled device configured to remotely activate any cards that come within a vicinity of the device, pulling in and storing any data from the cards of passersby. Such activity is called "card skimming." Malicious third parties may attempt to steal data of a card with the hopes of fraudulently using this information to execute future illicit transactions. In certain examples, a cardholder may enclose the card and/or wallet in a metallic layer (or other type of layer that can block electromagnetic radio-frequency (RF) signals) in order to attempt to impede or eliminate the ability of such a malicious third party stealing data of a card, but such blocking enclosures eliminate some of the convenience of the card. For example, by enclosing the card within the wallet using a metallic layer (e.g., a section of tin foil wrapped around the card), it may be difficult or impossible for a cardholder to simply orient a wallet near a merchant device to use the card. Rather, a cardholder may be required to remove the card from the wallet and/or take the card further out of the enclosure in order to remotely use the card.

Aspects of the disclosure relate to a blocking layer within the card that blocks respective antennas from receiving and/or sending electromagnetic signals (hereinafter referred to generically as signals) in a certain direction. The blocking layer may extend between two external major surfaces of the card with an antenna on either side of the blocking layer, such that the antennas send and/or receive signals in/from opposite directions. Further, each antenna may be configured to transmit a set of the identifying data, such that both sets of identifying data are needed to execute a transaction. By configuring the card with a blocking layer between two antennas that each send a distinct and necessary set of identifying data needed to execute a transaction, the card may reduce or eliminate the ability of a malicious third party to steal the data of a card for purposes of a future fraudulent transaction, as a skimming act would gather an insufficient amount of data needed to execute a transaction.

In some examples, the card may include two antennas that are both configured to transmit signals based off of data stored on an integrated circuit (IC) embedded in the card, and the IC may be configured to only couple to one antenna at a time. For example, both antennas may be coupled through a switch to the single IC with memory that stores data of the card, and the card may be configured to only couple one of the two antennas to the IC (and therein the memory) at a time. By configuring the card such that only one antenna may couple to (and therein transmit data of) the IC of the card at a time, the card may further reduce or eliminate the ability of a malicious third party to steal data of a card, even if a malicious third party is able to transmit electromagnetic signals from both sides of a card at the same time.

Aspects of the disclosure relate to using a substantially unique authentication key relating to the card to authenticate transactions using the card. The authentication key may be stored on the IC of the card as well as stored on a secure server managed by the financial institution that issues the card or holds the funds of the card. The card may be configured to substantially never transmit the unique authentication key. The merchant device may send a first set of identifying data received from the card to an authentication manager hosted on the secure server. In some examples, the merchant device may send the first set of identifying data to the authentication manager through a roaming server that is connected to a network of the authentication manager and is configured to collate different repositories of data related to the cardholder and/or card and/or transaction. In response to receiving the first set of identifying data, the authentication manager may use the identifying data to identify the respective authentication key of the card. The authentication manager may determine an authentication factor by executing a modification procedure using the authentication key and a random number, herein referred to as a variable, and then communicate the variable to the merchant device (e.g., through the roaming server). The merchant device may transmit this variable to the card, which may be configured to use the variable to locally determine an authentication factor using the locally-stored authentication key. The authentication factor as determined by the card may then be transmitted to the authentication manager through the merchant device and/or roaming server. The authentication manager may authenticate the card by comparing the two authentication factors, therein authorizing the merchant device (e.g., through the roaming server) to execute a transaction using data of the card if the two authentication factors are substantially identical. Configuring a system to authenticate a card using a variable and an authentication key that is never transmitted may further reduce or eliminate an ability of a malicious third party to steal data of the card for the purpose of fraudulently using this data for a future transaction by illicitly gathering transmitted data.

Aspects of the disclosure further relate to including a relatively long-range antenna on the card in addition to the two short-range antennas as discussed above. The relatively long-range antenna may have a relatively larger operational range than the two short-range antennas. The relatively long-range antenna may be configured to transmit less sensitive data. For example, the long-range antenna may be used to transmit data that a merchant device or another external device may use to identify a name or rewards program membership or deal or the like that is related to the cardholder that the merchant device and/or external device may then use in interacting with the cardholder. The data as stored and transmitted by the long-range antenna may be encrypted. The merchant device and/or other external devices may communicate through the roaming server and/or a network with the authentication manager, which may decrypt the transmitted data to identify the cardholder. The authentication manager may provide the identity of the cardholder to the merchant device and/or roaming server, which use the identity to identify a relevant name, rewards program, discount, product or the like that relates to the cardholder. The merchant device and/or external device may use this identifying information to instantiate transactions that are then executed using data transmitted by the short-range antennas. Alternatively, or additionally, the long-range antenna may be used to transmit credentials to access points to a building to function as an access card to get into or out of locations. By configuring the card to include a long-range antenna to transmit data of a greater distance than a cardholder may wish to transmit financial data, the card may have increased utility in certain applications.

FIG. 1 is a block diagram illustrating a system 101 in which an example card 100 stores identifying data on one or more ICs 112 and transmits data using first and second short-range antennas 110A, 110B (collectively "short-range antennas 110"). In some examples, card 100 also transmits data using at least one long-range antenna 114. It is to be understood that the short-range antennas 110 and long-range antenna 114 are depicted using signal lines for purposes of illustration only, and that antennas 110, 114 may comprise any shape and size configured to function as described herein. System 101 may further include one or more external devices 120A-C (collectively "external devices 120") and one or more merchant devices 130 that may communicate with each other or with card 100, one or more roaming servers 138 configured to as well as secure authentication server 150 that may communicate with merchant device 130 over network 140.

Card 100 may be a credit card, debit card, or some other type of identifying card that includes a set of unique information (e.g., a driver's license or student ID, a work badge, a parking card, or a hotel key card). Though card 100 is depicted with one IC 112 for purposes of illustration, in other examples card 100 may have two or more ICs 112 (e.g., as card 100B in FIGS. 2C and 2D). IC 112 may include a memory to store the identifying data and a switch to ensure that only one of the two short-range antennas 110 is coupled to IC 112 at a time. IC 112 may further include other circuitry components understood by one of ordinary skill in the art to be used to execute the functions described herein. In addition to short-range antennas 110 and long-range antenna 114 as described herein, card 100 may further include a magnetic strip for swiping and/or IC 112 may be configured to be readable by a conventional chip reader (e.g., as a result of inserting card 100 into the chip reader). In some examples, card 100 may be configured to utilize antennas of card 100 even when a transaction is executed using a conventional chip reader (e.g., by sending data using long-range antenna 114 to instantiate a sale or sending transactional details in a receipt signal upon execution of a transaction).

The identifying information stored on card 100 may include information related to a cardholder of card 100, such as a name, username, telephone number, email address, identification number (e.g., driver's license number, student identification number, work identification number), or the like. The identifying information may include unique financial information about the cardholder, such as an account number, routing number, passcode, PIN, password, or the like that identifies a financial account of the cardholder at a financial institution (e.g., the financial institution that issues card 100 and manages authentication manager 152 of authentication server 150). The major surface of card 100 may be made of any material, such as polymer (e.g., polyvinyl chloride acetate), carbon fiber, or some combination of these or other materials.

As discussed herein, card 100 may be configured to only couple one of the two short-range antennas 110 to the IC 112 at a time. For example, as discussed above, card 100 may include a switch that is configured to only electrically couple one short-range antenna 110 to the IC 112 at a time. Short-range antennas 110 may be radio frequency (RF) antennas, such that card 100 is a radio frequency identification (RFID) card. Card 100 may not include a battery or other power source for IC 112 or antennas 110, 114. Instead, card 100 may be powered by electromagnetic fields created by interrogating signals that are received by one of the antennas. When powered by the received interrogating signals, IC 112 may send reply signals containing certain information of the memory of IC 112 using the respective antenna 110.

Card 100 may be configured such that an initial signal sent by a respective short-range antenna 110 includes a first discrete and predetermined portion or subset of the set of unique information, and a subsequent signal sent by the other short-range antenna 110 includes a second discrete and predetermined portion or subset of the set of unique information. For example, first short-range antenna 110A may send a first signal that includes a first predetermined subset of the identifying information of IC 112 and second short-range antenna 110B may send a second signal that includes a second subset of the identifying information of IC 112. The first subset of information may be at least partially different than the second subset of information. For example, the first subset of information may be entirely different than the second subset of information, or the first subset of information may partially overlap with the second subset of information.

In some examples, either short-range antenna 110 may send either predetermined subset of unique information. For example, card 100 may be configured such that either short-range antenna 110 may send an initial signal that includes a first subset of unique information, as long as the alternate short-range antenna 110 sends the subsequent signal that includes the second subset of unique information. In other examples, card 100 may be configured such that each short-range antenna 110 may only send a certain predetermined portion of unique information, such that the respective other short-range antenna 110 cannot send the certain predetermined portion of unique information.

Card 100 may be configured such that each short-range antenna 110 only receives and sends signals in some directions. For example, card 100 may be configured such that each short-range antenna 110 only sends and receives signals through one of the two opposing major surfaces of card 100. First short-range antenna 110A may be configured to send and receive signals through a first major surface of card 100, while second short-range antenna 110B is configured to send and receive signals through a second (e.g., different than first) major surface of card 100. Though it is to be understood that any antenna described herein may be on either major surface of card 100, first short-range antenna 110A is discussed herein as being on the "front" major surface of card 100 (e.g., a surface that displays a name of the cardholder and/or a name of the institution), while second short-range antenna 110B is discussed herein as being on the "back" major surface (e.g., a surface that includes a magnetic strip of card 100).

Card 100 may include a blocking layer of card 100 to configure each short-range antenna 110 to only receive and send signals in some directions. For example, first short-range antenna 110A may be located relatively closer to a first/front major surface and second short-range antenna 110B may be located relatively closer to a second/back major surface of card 100 such that the blocking layer 100 extends between them. In this way, blocking layer 100 may block first short-range antenna 110A from receiving or sending signals through the second major surface while simultaneously blocking second short-range antenna 110B from receiving or sending signals through the first major surface.

The blocking layer may be made of any material that is configured to block RF signals. For example, the blocking layer may be metallic such as aluminum or tin. The blocking layer may extend within card 100 between the two short-range antennas 110. In some examples, the blocking layer extends substantially all the way across card 100, such that the blocking layer extends to the outer edges of card 100 between the two major surfaces. In other examples, the blocking layer only extends across card 100 a length sufficient to block signals to and from respective short-range antennas 110 in the intended directions.

In some examples, card 100 may additionally include long-range antenna 114. Long-range antenna 114 may also be coupled to IC 112. In some examples, long-range antenna 114 may be coupled to a different IC 112 than short-range antennas 110 (e.g., long-range antenna 114 may be coupled to an IC that is better suited for long-range communication, or an IC that stores only the relevant information that long-range antenna 114 transmits). Long-range antenna 114 may also be an RFID antenna, and long-range antenna 114 may be configured to have a relatively greater range than short-range antennas 110. For example, short-range antenna 110 may be configured to operate at a relatively low-frequency range (e.g., 125 kilohertz or 134.3 kilohertz) and therein have an operational range of approximately 10 millimeters from a source or destination, while long-range antenna 114 may be configured to operate at a relatively high-frequency range (e.g., 860 megahertz or 960 megahertz) and therein have an operational range of approximately five meters. The operational range of card 100 may be altered by a relative thickness of card 100, a size of short-range antennas 110 and long-range antenna 114, the material of card 100, the actual IC 112 used in card 100, and the like. Other operational ranges in other examples are also possible.

Long-range antenna 114 may be configured to send a third set of data. In some examples, the third set of data may be related to generally identifying the cardholder of card 100. The third set of data may not contain financial data of card 100. Long-range antenna 114 may be configured to send the third set of data to instantiate a transaction or record a transaction executed using card 100.

Card 100 may communicate with merchant device 130 of system 101. As discussed herein, merchant device 130 may be a device that processes transactions for a merchant, such as a point-of-sale (POS) device. Merchant device 130 may include purchase controller 132, antenna 134, and display 136. Purchase controller 132 may be a software module configured to execute functions attributed to merchant device 130 herein, while antenna 134 may be a three-dimensional coil or printed trace or the like that is configured to send and receive electromagnetic signals as discussed herein. Merchant device 130 may include a processor and a memory, where the memory stores instructions relating to the functions attributed to merchant device 130 (e.g., such that the memory stores purchase controller 132) and the processor executes the functions (e.g., executes the actions of purchase controller 132).

Display 136 may function as one or more output (e.g., display) devices using technologies including liquid crystal displays (LCD), dot matrix displays, light emitting diode (LED) displays, organic light-emitting diode (OLED) displays, e-ink, or similar monochrome or color displays capable of generating tactile, audio, and/or visual output. Display 136 may include a cathode ray tube (CRT) monitor, liquid crystal display (LCD), Light-Emitting Diode (LED) display, or any other type of display device. Display 136 may output information to a cardholder in the form of a user interface which may be associated with functionality provided by merchant device 130.

Although display 136 is illustrated in FIG. 1 as being implemented within merchant device 130, in other examples, display 136 could be implemented external to merchant device 130. As such, display 136 may represent an external or partially external component that shares a data path with merchant device 130 for transmitting and/or receiving input and output. For instance, in some examples, display 136 represents a built-in component of merchant device that is located within and physically connected to the external packaging of merchant device (e.g., a customer-facing screen on the point-of-sale merchant device 130). In other examples, display 136 represents an external component of merchant device 130 that is located outside and physically separated from the packaging or housing of merchant device 130 (e.g., a monitor, a projector, etc. that shares a wired and/or wireless data path with merchant device 130). In still other examples, one or more components of display 136 may be built-in components of merchant device 130, and one or more components of display 136 may be external components of merchant device 130 (e.g., some components of display 136 may be internal, and others may be external).

In some examples, both purchase controller 132 and antenna 134 may be within a single housing of merchant device 130, whereas in other examples antenna 134 may be in one or more physically separate housings that are physically or wirelessly connected to merchant device 130 to communicate with purchase controller 132. Merchant device 130 may include a cluster of one or more computers, workstations, servers, and the like. For example, a first server may host purchase controller 132 while a separate computer includes antenna 134 and other components that are necessary to execute transactions at a storefront of the merchant. Merchant device 130 may be physically or virtually included within an internal network of the merchant. Alternatively, some of merchant device 130 may be physically or virtually included in a network hosted by a third-party vendor and therein used by the organization or business. For example, a vendor of the merchant may store and maintain purchase controller 132 for the merchant and/or may provide the functions of purchase controller 132 as a service to the merchant.

Merchant device 130 may be connected to roaming server 138. Similar to merchant device 130, roaming server 138 may include a cluster of one or more computers, workstations, servers, and the like. Roaming server 138 may that include at least one memory and one processor, wherein the memory stores information and instructions that relate to the functions attributed to roaming devices 138 herein (e.g., roaming server 138 may store received identifying information and/or gathered customization information as discussed herein), while the processor is configured to execute these functions. Roaming server 138 may be configured to gather customization data (e.g., data for customizing a transaction for cardholder) from numerous sources for merchant device 130. For example, roaming server 138 may gather product data, discount data, reward data, or the like from a repository managed by the merchant. For another example, roaming server 138 may gather financial updates (e.g., new products or rewards available to the cardholder available to the cardholder as a result of a current or previous transaction), security data (e.g., warnings about new malicious activity relevant to the cardholder), or the like from a repository managed by the financial institution of card 100.

Roaming server 138 may be connected to network 140. Network 140 may comprise a private network including, for example, a private network associated with a financial institution and the merchant. Alternatively, network 140 may comprise a public network, such as the Internet. Although illustrated in FIG. 1 as a single entity, in other examples network 140 may comprise a combination of public and/or private networks. As depicted on FIG. 1, authentication server 150 may be accessed through network 140.

In some examples, merchant device 130 may communicate with authentication server 150 through roaming server 138, as merchant device 130 does not have access to network 140. For example, merchant device 130 may be a POS device that does not have internet connectivity, but rather is connected to a local area network which includes roaming server 138. In this example, merchant device 130 may substantially only have access to external data (e.g., new product data, financial data, authentication data, security data, personalization data, or the like) as a result of receiving said data from roaming server 138. For purposes of clarity, merchant device 130 and roaming server 138 are referenced and discussed herein as separate components, such that merchant device 130 is discussed as substantially or exclusively gathering customization data relating to authenticating card 100 and/or customizing transaction for cardholder via roaming server 138. However, it is to be understood that in other examples merchant device 130 may have direct access to network 140 (e.g., such that merchant device 130 directly interacts with authentication server 150 through network 140 to authenticate card 100), and/or roaming server 138 and merchant device 130 may be a single computer, or merchant device 130 and roaming server 138 may be part of a single cluster of one or more computers. For example, merchant device 130 may be a POS device that both sends signals to and receives signals from card 100 as described herein, as well as executing the functions of roaming server 138 by gathering customization data from and communicating with other internal and external computing devices within system 101 to authenticate card 100 as described herein and gather customization data for personalized/customized transactions for the cardholder.

Merchant device 130 may transmit an instantiating signal using antenna 134. The instantiating signal, similar to other signals discussed herein, may be an RF signal. Long-range antenna 114 of card 100 may receive the instantiating signal, and in response long-range antenna 114 may send identifying information to merchant device 130. Identifying information may include information such as a name, phone number, email address, or rewards program number.

The identifying information as received by merchant device 130 may be encrypted. In order to make use of the received encrypted data, merchant device 130 may send the encrypted device to roaming server 138, which may send data to authentication server 150 over network 140. Authentication server 150 may decrypt the received encrypted data and transmit the decrypted identifying information back to roaming server 138. Authentication server 150 may decrypt the encrypted data by any technique known to one skilled in the art. For example, authentication server 150 may use a predetermined cipher to decrypt the encrypted data of card 100 as received by merchant device 130 and sent by roaming server 138. Roaming server 138 may use the identifying information to identify the cardholder (e.g., by cross-referencing the identifying information with a databases of cardholders). Once the cardholder is identified, roaming server 138 may gather customization data associated with the cardholder or the transaction or the like in order to create a customized transaction.

For example, roaming server 138 may gather customization data from a financial institution server (e.g., as accessed over network 140) that relates to the cardholder achieving a milestone (e.g., having spent $250 within a calendar month) and therein gaining a perk (e.g., a certain amount of airline miles) as a result of the upcoming transaction, and roaming server 138 may gather customization data from a merchant server (as accessed over network 140 or accessed over an internal network) to identify that the cardholder prefers paper receipts. Once roaming server 138 collates this transaction-customizing data, roaming server 138 may provide this data and other identifying data to merchant device 130.

Once received, merchant device 130 may instantiate a transaction. For example, merchant device 130 may have received the encrypted identifying information from the cardholder while the cardholder is the third person in line to purchase items at merchant device 130. Concurrent with executing transactions for a separate first customer and second customer that are in line to purchase other items, merchant device 130 and/or roaming server 138 may identify the cardholder using the encrypted identifying information, prepare a customized transaction, and instantiate the customized a transaction for the cardholder. For example, merchant device may instantiate the transaction to the cardholder while the cardholder is still third in line. Instantiating a transaction to the cardholder may include preparing a customized message to display to the cardholder using display 136 related to, e.g., the upcoming milestone and perk of cardholder. Further instantiating a transaction to the cardholder may include the merchant device 130 providing relevant information to a teller that is managing merchant device 130, such as a name of the cardholder, identified preferences of the cardholder such as the use of paper receipts, or the like. Further, instantiating the transaction may include pre-completing any records or transmissions that are associated with the transaction or opening up a channel of communication between merchant device 130, roaming server 138, and authentication manager 152, so that ensuing authentication actions may be immediately executed. Configuring merchant device 130 and/or roaming server 138 to thusly instantiate a transaction before the cardholder has used either short-range antenna 110 to transmit financial data may decrease an amount of time required to authenticate and therein execute a transaction and increase an ability of merchant device 130 to identify and provide actions and services that are tailored to the cardholder.

Merchant device 130 may transmit a first interrogating signal to card 100. Antenna 134 of merchant device 130 may transmit the first interrogating signal. In some examples, antenna 134 may send the first interrogating signal in response to receiving the signal from long-range antenna 114 with the identifying information. In other examples, merchant device 130 may be pseudo-continuously sending the first interrogating signal (e.g., sending the first signal for a second-long interval every other second). In certain examples, merchant device 130 only sends the first interrogated signal when manually instructed to (e.g., as a result of a cashier operating merchant device 130).

First short-range antenna 110A of card 100 may receive the first interrogating signal when first short-range antenna 110A is within operational range of antenna 134. First short-range antenna 110A may receive the first interrogating signal as a result of card 100 being held by the cardholder in a first orientation where the first major is oriented facing toward antenna 134. Card 100 may be configured to use the first interrogating signal to power IC 112 and send a first signal that includes a first subset of identifying data stored on IC 112 using first short-range antenna 110A. As discussed herein, in some examples either short-range antenna 110 may be used to transmit an initial/first signal with an initial/first subset of identifying data, so long as the respective other short-range antenna 110 is used to transmit the subsequent/second signal with a subsequent/second subset of identifying data. Alternatively, in other examples, first short-range antenna 110A may be configured to transmit an initial signal with a predetermined first subset of data while second short-range antenna 110B is configured to transmit a subsequent signal with a predetermined second subset of data, or vice versa.

In response to merchant device 130 receiving the first signal that includes the first subset of data, merchant device 130 may send a second interrogating signal. Specifically, purchase controller 132 may command antenna 134 to send the second interrogating signal. The card 100 may be configured to respond to the second interrogating signal using second short-range antenna 110B, such that a transaction may not proceed until the cardholder reorients card 100 such that the second major surface (and therein second short-range antenna 110B) is facing antenna 134. In some examples, merchant device 130 may provide a message with display 136 that instructs the cardholder to reorient card 100 to the second orientation when antenna 134 is transmitting the second interrogating signal. In other examples, card 100 may include an indicating element that may indicate, among other things, when a cardholder should orient card 100 to the second orientation. Other means for indicating to a cardholder that the cardholder should reorient card 100 are also possible.

Once card 100 is reoriented to the second orientation, card 100 may use the second interrogating signal to transmit a second signal using second short-range antenna 110B. Card 100 may be configured to use the second interrogating signal to power IC 112 and send a second signal that includes a second subset of identifying data stored on IC 112 using second short-range antenna 110B. Antenna 134 may receive the second signal that includes the second subset of identifying data from second short-range antenna 110B. Purchase controller 132 may use the first subset of identifying data and the second subset of identifying data to execute a transaction. Both the first and second set of identifying data of card 100 may be required to complete the transaction, such that neither the first set of data nor the second set of data, without the respective other set, may be used independently to execute the transaction.

In some examples, the two short-range antennas 110 may be configured to respond to the interrogating signals with a predetermined order of information in order for merchant device 130 may utilize to execute a transaction. Put differently, in some examples the first signal that includes the first subset of identifying data must be sent prior to the second signal that includes the second subset of data for a transaction to be executed. For example, purchase controller 132 of merchant device 130 may be configured to execute a transaction by processing a first set of identifying data of the first signal prior to receiving and processing a second set of identifying data of the second signal.

In some examples, if card 100 is positioned in the first orientation when antenna 134 sends the second interrogating signal (such that first major surface is positioned facing antenna 134), card 100 may transmit the second signal using second short-range antenna 110B in a direction away from antenna 134 (e.g., such that antenna 134 would not receive or detect the second signal). Upon failing to receive a signal from card 100, merchant device 130 may output an error, such as on display 136 of merchant device 130. In other examples, if card 100 is positioned in the first orientation when antenna 134 sends the second interrogating signal, IC 112 may be configured to send an error signal that is distinct from the first or second signal (e.g., a signal indicating that card 100 is improperly orientated, or a garbled signal that is functionally unusable by merchant device 130 that indicates to merchant device 130 that card 100 is improperly oriented). In other examples, IC 112 may identify that first short-range antenna 110A is receiving the second interrogating signal and therein determine that card 100 is improperly oriented. Upon determining that card 100 is improperly oriented, IC 112 may indicate an error in a manner that is detectable by the cardholder (e.g., a red light or a beep as discussed herein).

In this way, purchase controller 132 may be configured to only execute a transaction in response to a successful reception of both the first and second signal from first and second short-range antennas 110A, 110B in a certain order that communicates a single set of financial data that can be used to process the transaction (e.g., an account number, pin number, password, one-time passcode, or the like for a checking account used by a cardholder of card 100). Configuring system 101 to execute a transaction upon successful transmittal of data through both sides of card 100 may reduce or eliminate the ability of malicious parties to execute fraudulent transactions using data gathered by card skimming one half of card 100 as described herein.

In some examples, system 101 may be configured to use data of the first signal as sent by first short-range antenna 110A to craft the second interrogating signal such that card 100 may be authenticated. For example, authentication manager 152 may use some identifying data of the first signal (e.g., as sent by purchase controller 132 through roaming server 138) to preemptively determine what some of the second signal (e.g., as send by second short-range antenna 110B) should be in response to a predetermined prompt, and only authorize a transaction upon matching the second signal to this predicted authentication factor. In some examples, this authentication factor is created by card 100 using a "seed" or authentication key stored by IC 112.

The authentication key may be a substantially unique series of characters, such that it may be relatively difficult to guess the authentication key and it is relatively unlikely for two cards 100 to have identical authentication keys. The authentication key may be initially created by the financial institution of card 100 and authentication server 150. The financial institution may create the authentication key such that the only two copies of the authentication key are stored by/on authentication server 150 and card 100. In some examples, both card 100 and authentication server 150 are configured to never transmit the authentication key, such that merchant device 130 is configured to execute the transaction without receiving, storing, or otherwise directly using the authentication key. Rather, purchase controller 132 may receive from roaming server 138 a verification from authentication manager 152 of authentication server 150 that authentication manager 152 was able to successfully authenticate card 100 (e.g., using the authentication key unique to card 100).

Authentication server 150 may include a cluster of one or more computers, workstations, servers, and the like. Authentication server 150 may be owned or otherwise managed or used by the financial institution that issues card 100. Authentication manager 152 may communicate over network 140 with merchant device 130 relating to transactions performed using card 100. In some examples, merchant device 130 may communicate with authentication manager 152 over network by working through other intermediary entities, such as a payment processing entity, a credit card network, the financial institution that issued card 100, or the like. Authentication manager 152 may establish and maintain a log of transactions using card 100 and transmission using first and second short-range antennas 110 as received by merchant device 130 or other entities. Authentication manager 152 may add new entries to this log with additional transactions as authenticated by authentication manager 152. Each of these entities may include a separate network or computing device through which communication may be daisy-chained so that authentication manager 152, roaming server 138, and merchant device 130 may be in communication.

For example, a first signal sent by first short-range antenna 110A in response to the first interrogating signal may include enough information for the authentication server 150 to identify card 100. The subset of identifying data of the first signal may include an account number of the cardholder, or a username of the cardholder, or the like. Purchase controller 132 may receive the first subset of identifying information and provide the first subset of identifying information to roaming server 138 to transmit over network 140 to authentication server 150. Authentication manager 152 of authentication server 150 may use the first subset of identifying information to identify the cardholder and identify a respective locally stored authentication key 154 that exactly matches the authentication key stored on card 100. Authentication manager 152 may have access to substantially all authentication keys 154 for cards issued by the financial institution, whether authentication keys 154 are stored within authentication server 150 as depicted in FIG. 1 or whether stored at a secure location accessible to authentication manager 152.

Upon identifying respective authentication key 154 for card 100, authentication manager 152 may perform a predetermined procedure using the respective authentication key 154 to determine an authentication factor. Authentication manager 152 may use one or more random numbers or variables to determine the authentication factor. Authentication manager 152 may send a message to purchase controller 132 through network 140 and roaming server 138 that includes the variable. Upon receiving the variable, purchase controller 132 may cause antenna 134 to transmit the second interrogating signal to card 100 such that the second interrogating signal includes the variable.

IC 112 may be configured to identify the variable as received by second short-range antenna 110B. Once identified, IC 112 may use the variable to perform the same predetermined procedure (e.g., the same as performed by authentication manager 142) using the authentication key stored on IC 112. IC 112 may independently (e.g., independently of authentication manager 152 and purchase controller 132) determine the authentication factor as part of the procedure. IC 112 may cause second short-range antenna 110B to communicate the authentication factor to merchant device 130 along with the second set of identification data.

Upon receiving the second signal from second short-range antenna 110B, purchase controller 132 may provide the authentication factor to roaming server 138 for transmission to authentication manager 152 for authentication. Authentication manager 152 may compare the authentication factors as created by card 100 and created by authentication manager 152. If the authentication factors match, authentication manager 152 may transmit a message indicating the successful authentication to purchase controller 132 through network 140 and roaming service 138. In response to this successful authentication message, purchase controller 132 may use the first set of data and the second set of data sent by short-range antennas 110 of card 100 to process the transaction. By requiring a transmitted authentication factor that was created by card 100 based on a secret (e.g., untransmitted) authentication key stored on card 100 to match an authentication factor that was created by a remote authentication manager 152 before merchant device 130 executes a transaction, system 101 may reduce or eliminate an ability of a malicious entity to execute a fraudulent transaction with a merchant by skimming data of one or both sides of card 100.

Card 100 may also communicate with one or more external device 120A-120C (collectively "external devices 120") of system 101. External devices 120 may be computer devices that include at least a memory, a processor, and an antenna to send and receive signals, wherein the memory stores information and instructions that relate to the functions attributed to external devices 120 herein and the processor is configured to execute these functions. In some examples, external devices 120 are predominantly or exclusively configured to communicate with long-range antenna 114 of card 100 using long-range signals (e.g., and therein only communicate relating to data that long-range antenna 114 has access to, which may not include financial data of card 100). External devices 120 may be computer devices that are configured to send signals to and receive signals from card 100. For example, external devices 120 may include door sensors, cell phones, automation systems, display systems, or the like. External devices 120 may be configured to perform functions in response to communicating with card 100, such as transmitting received data to or otherwise acting in concert with other parties or devices (e.g., such as merchant device 130), storing data from card 100 for future use, performing various automation functions on behalf of the cardholder, or the like.

In some examples, data as received by external devices 120 from card 100 may be encrypted, such that substantially no external device 120 has an ability to read or otherwise use the received data. In this example, external devices 120 may route the encrypted received data to authentication server 150 to have the encrypted data decrypted and returned to external devices 120. For example, external devices 120 may transmit the encrypted data to roaming server 138, which may in turn route the encrypted data to authentication server 150 via network 140. Subsequent to this, roaming server 138 may receive from authentication server 150 some or all of the encrypted data that was sent by card 100 in a decrypted format such that roaming server 138 and/or external devices 120 may read or otherwise use the decrypted data. In some examples, roaming server 138 may be configured to gather additional data (e.g., over network 140 or from other connected computer repositories) that is related to the decrypted data for external devices 120, such that external devices 120 may use both the decrypted data and the additional gathered data in executing respective functions. Alternatively, in some examples external devices 120 may be configured to directly connect to network 140 and therein communicate with authentication server 150 in order to provide the received encrypted data to authentication server 150 and receive decrypted data from authentication server 150.

Though three external devices 120 are depicted in FIG. 1 for purposes of clarity, it is to be understood that system 101 may include any number of external devices 120 that are associated with different entities (e.g., associated with a cardholder, merchant, financial institution). Card 100 may communicate with external devices 120 using RFID techniques. Further, external devices 120 may be configured to communicate with roaming server 138 in some examples to decrypt information received from card 100 and/or to pull information from roaming server 138 to display to a cardholder or otherwise use in interacting with card 100. Alternatively, in some examples external device 120 may be configured to connect directly to network 140 and therein communicate directly with authentication server 150 to decrypt data received from card 100.

External devices 120 may include devices that are owned or managed by the cardholder of card 100. For example, external device 120A may be a cell phone that is used by the cardholder of card 100, while external device 120B may be a home-automation device owned by the cardholder, and external device 120C is a garage door opener for a garage door of the cardholder. Upon using card 100 for a successful transaction (whether using short-range antennas 110 as described herein or using a magnetic strip of card 100 or a chip reader of the merchant), card 100 may transmit details of the executed transaction to the cell phone external device 120A using NFC circuitry of the cell phone external device 120A. For example, card 100 may use long-range antenna 114 to transmit a merchant identification and a list of goods purchased to the cell phone external device 120A, which may then record a date and time of the purchase. The cell phone external device 120A may be configured to cross-verify these transactions against a monthly statement from a bank and flag any discrepancies. Further, home automation external device 120B may be configured to detect when the cardholder arrives at a home of the cardholder (e.g., by receiving a signal from long-range antenna 114 of card 100 that is carried by the cardholder). In response to detecting the cardholder, home automation external device 120B may change home settings from "away" to "home," executing all home automations associated therewith. Similarly, garage door opener external device 120C may be configured to detect when the cardholder approaches the garage door, in response to which garage door opener external device 120C may open the garage door of the cardholder. In this way, a cardholder may own or otherwise manage one or more external devices 120 that interact with card 100 using long-range antenna 114 in response to executed transactions and in response to other cardholder actions. Other examples of cardholder-associated external devices 120 are also possible. External device 120 that are associated with user may not need to communicate with roaming server 138 to decrypt data from card 100. Instead, card 100 may be configured to transmit details to external devices 120 that are associated with the user in a decrypted manner, or these external devices 120 may be configured to decrypt transmission details itself (e.g., by interacting with authentication manager 152 through a software application that has access to network 140).

Alternatively, external devices 120 may include devices that are not owned or managed by the cardholder of card 100 or by a financial institution that issues card 100. In some examples, external devices 120 may be associated with the merchant that owns or manages merchant device 130. For example, external device 120A may be an entrance station of a parking garage located at an entrance and exit to the parking garage. Entrance station external device 120A may send out an electromagnetic instantiating signal that is detected by long-range antenna 114. Card 100 may use the power from this signal to cause long-range antenna 114 to transmit an identifying signal to entrance station external device 120A as entrance station raises a railing to provide cardholder access to the parking garage. The identifying signal may include encrypted information such as a name, date of birth, username, or the like that is related to the cardholder. Entrance station external device 120A may send the encrypted information to roaming server 138. In some examples, entrance station external device 120A may send further information to roaming server 138, such as an identity or location of entrance station external device 120A (e.g., where roaming server 138 handles requests from a plurality of parking garages) or a set of products or services to which entrance station external device 120A is associated (e.g., a parking service for entrance station external device 120A, where roaming server 138 also receives information from external devices 120 that are associated with other products or services). Upon receiving information from entrance station external device 120A, roaming server 138 may then send a request to a secure server associated with the financial institution (e.g., authentication server 150) to decrypt the identifying information. Roaming server 128 may receive this decrypted identifying information and use it to identify the cardholder, therein using this identity (and potentially the other information from external devices 120 as discussed herein such as a location and products/services associated with external devices 120) to gather corresponding reward programs, current and upcoming promotional deals, current prices, expected transactional details, and the like. Simultaneously, external device 120B that includes a computerized display at a parking spot may detect that the cardholder has parked at the parking spot related to computerized display external device 120B in much the same manner as entrance station 120A detects card 100 (e.g., sending an instantiating signal that is responded to by long-range antenna 114 of card 100).

In response to detecting the cardholder parking at the respective parking spot, roaming server 128 and/or computerized display external device 120B may use the gathered data to create a customized message that is displayed by external device 120B. This customized message may include data that has been identified as relevant to the cardholder. The message may welcome the cardholder and inform the cardholder of relevant rates, programs, or discounts that are available to her (e.g., depending upon how long the cardholder parks her car). Upon detecting the cardholder returning to the parking spot using the techniques described herein, the computerized display external device 120B may welcome back the cardholder and informing her of her total charges. External device 120B may then send these charges to merchant device 130 (e.g., a toll booth at the exit of the parking garage), which may then execute a transaction regarding these charges using card 100 as described herein.

In some examples, computerized display external device 120B may be configured to accept an input from the cardholder. For example, the input may include an acceptance of one or more rates or options or a notice for future transactions. Computerized display external device 120B may include a touch screen that the cardholder may utilize to provide an input, or computerized display 120B may include a microphone that can detect an auditory input of the cardholder, or computerized display 120B may include another component such as a keypad that the cardholder may utilize to provide the input, or the like. For example, computerized display 120B may visually and audibly present (e.g., with a display and with a speaker) daily rates, weekly rates, or monthly rates available to the cardholder for the parking spot, as well as providing a notice as to a new security feature available from the financial institution (e.g., as previously identified and gathered by roaming server 138) and alerting the cardholder to a free parking day that he has earned due to the patronage of cardholder at the respective parking garage. Computerized display external device 120B may then detect the cardholder audibly speaking "I'll take my usual daily rate, no thank you on the security feature, and please remind me the next time I am parking during peak-pricing events to use my free parking day."

In response to receiving the input from the cardholder, computerized display external device 120B may transmit the received input to merchant device 130, so that merchant device 130 may use the input to process the final transaction (e.g., applying the daily rate in processing the transaction as per the input of the cardholder). Further, computerized display external device 120B may send some or all input to roaming server 138 to store at the one or more repositories for future use and/or analysis. For example, in response to the input, in future events roaming server 138 may only gather the free parking day as relevant data when current pricing indicates peak pricing. Further, roaming server 138 may forward along responses and data from the input of the cardholder to the financial institution (e.g., transmitting a message through network 140 to the financial institution that the cardholder does not appear to be interested in the security feature). In this way, by gathering customer input and responding to it over time, roaming server 138, merchant device 130, and external devices 120 may improve at providing services and executing transactions in a manner that is preferable to the cardholder.

For another example of external devices 120 that are associated with a merchant, external device 120C may be a sensor near a door of a building owned by the merchant that sends a long-range signal to and receives an encrypted long-range signal from long-range antenna 114 of card 100 identifying the cardholder (e.g., identifying by name, rewards program, email, social security number, date of birth, driver's license number, or the like). As discussed above, external device 120C may provide this encrypted information to authentication server 150 via roaming server 138 to identify the cardholder. Once an identity of the cardholder is sent back to external device 120C, external device 120C may inform merchant device 130 that card 100 is within the building, in response to which merchant device 130 may retrieve information on the cardholder that may be used to expedite an eventual sale (e.g., as a result of the relevant information being stored in rapid access memory of merchant device 130 rather than in a relatively slower long-term memory component of merchant device 130). If external device 120C detects card 100 departing the building, external device 120C may inform merchant device 130 of this departure so that merchant device 130 may delete the cardholder info from the rapid access memory. External device 120C may further provide information on cardholder visits to the merchant even if the cardholder does not eventually execute a transaction, enabling the merchant to better analyze data of cardholder behaviors.

In other examples, external devices 120 may not be owned or managed by the cardholder of card 100, the merchant, or the financial institution. For example, external devices 120A-C may be terminals that are used to gain entry to a secure building or structure, such as a terminal to unlock respective doors to the building. As the cardholder approaches the door, long-range antenna 114 may send identifying information to the respective external devices 120, which may then transmit this identifying information to authentication server (e.g., via roaming server 138) to identify the cardholder, in response to which the respective door may be unlocked and/or opened.

Figure 2A:
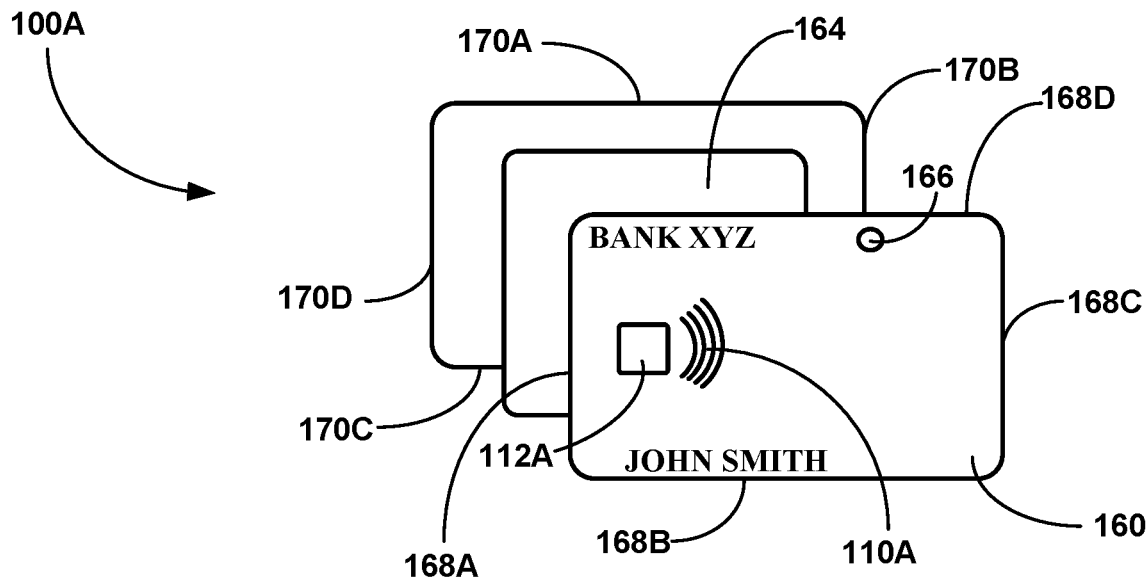
FIGS. 2A and 2B are conceptual and schematic diagrams illustrating an exploded view of the card of FIG. 1 with two short-range antennas from the front and from the back of the card, respectively, in accordance with the techniques of this disclosure.
Figure 2B:
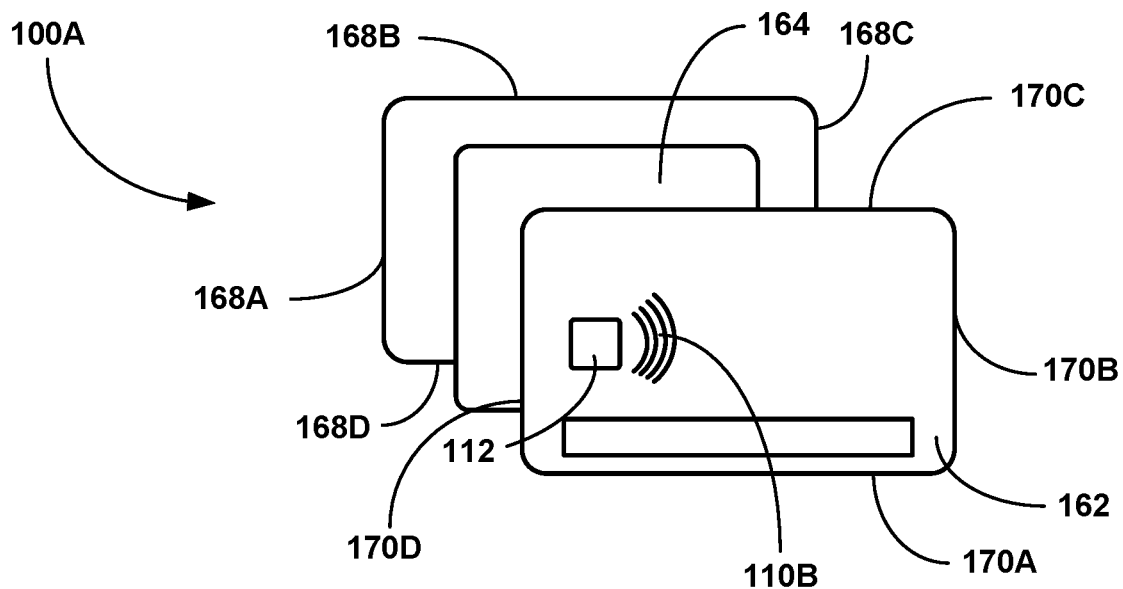

FIGS. 2A and 2B depict conceptual and schematic diagrams of exploded views of an example card 100A from front major surface 160 of card 100A and back major surface 162 of card 100A, respectively. Card 100A may be an example of card 100 of FIG. 1 that only utilizes short-range antennas 110, while card 100B of FIGS. 2C and 2D utilizes both short-range antennas 110 and long-range antennas 114. Front major surface 160 may generally define four outer edges 168A-168D (collectively "outer edges 168"). Similarly, back major surface 162 may generally define four outer edges 170A-170D (collectively "outer edges 170"). Front major surface 160 and back major surface 162 may be substantially the same shape. For example, when front major surface 160 is aligned with back major surface 162, outer edges 168 of front major surface 160 may define a substantially similar shape as outer edges 170 of back major surface 170. Both the specific shape of card 100A and the specific location of components on card 100A are depicted for purposes of illustration only, as other general shapes or component locations may be used in other examples. For example, card 100A may have less rounded corners and/or a location of short-range antennas 110 may be changed in other examples.

FIGS. 2A and 2B depict blocking layer 164 between front major surface 160 and back major surface 162. As depicted, blocking layer 164 may extend only partially across card 100A (e.g., such that blocking layer 164 contacts less than all outer edges 168, 170 of front major surface 160 and back major surface 162, respectively). Blocking layer 164 may extend within card 100A between first short-range antenna 110A and second short-range antenna 110B. Blocking layer 164 extends within card 100A between first short-range antenna 110A and second short-range antenna 110B a sufficient distance to block electro-magnetic fields between each respective short-range antenna and the respective opposing side of card 100A. In some examples, blocking layer 164 may be relatively larger or smaller than blocking layer 164 as depicted in FIGS. 2A and 2B so long as blocking layer 164 is of a size that is sufficient to functionally configure short-range antennas 110 of card 100A to be unidirectional in opposing directions. As a result of positioning blocking layer 164 between first and second short-range antennas 110 in this manner, card 100A may be configured such that a malicious card skimmer can only receive a portion of identifying financial data of card 100A (e.g., where more than the portion of identifying financial data of card 100A is required to successfully complete a transaction).

As depicted in FIGS. 2A and 2B, card 100A includes one IC 112A. IC 112A may be configured to cause short-range antennas 110 to transmit signals. IC 112A may be visible and extend to at least one major surface 160, 162 of card 100A to enable card 100A to be inserted and read by a "dip" chip reader.

In some examples, IC 112A may extend through blocking layer 164, such that a section of blocking layer 164 is cut out of blocking layer 164 to enable IC 112A to extend to both major surfaces 160, 162. In other examples, IC 112A may not extend to both major surfaces 160, 162 of card 100A, but instead IC 112A may be on one surface 160 and may be coupled through blocking layer 164 to the respective short-range antenna 110 on the opposing surface. In certain examples, blocking layer 164 may be located such that blocking layer 164 does not extend between IC 112A and either major surface 160, 162 of card 100A, such that IC 112 may directly connect to both short-range antennas 110 without extending through or being coupled through blocking layer 164.

Card 100A may include indicator 166. Though only one indicator 166 on front major surface 160 is depicted on card 100A, in other examples card 100A may include two or more indicators 166 on front major surface 160 or back major surface 162. In some examples, a single indicator 166 may extend from front major surface 160 to back major surface 162.

Indicator 166 may be a component that is configured to provide a visual and/or auditory alert. For example, indicator 166 may be a light-emitting diode (LED) that is configured to emit a light of one or more colors or indicator 166 may be a component that beeps or vibrates (e.g., using an oscillating circuit) in one or more manners. In some examples, card 100A includes many indicators 166, each of which provides a different alert (e.g., a plurality of LEDs that each emit a different color). IC 112A may be coupled to indicator 166 and may control outputs (e.g., lights or beeps) of indicator 166. Indicator 166 may provide different indications in response to different events as detected or identified by ICs 112A, such as producing lights of different color or different numbers of beeps of different frequencies or durations. For example, indicator 166 may provide a first indication (e.g., a blue color or a first beep) when card 100A is to be positioned in the first orientation (e.g., when IC 112A detects a first interrogating signal), and provide a second indication (e.g., a yellow color or a second beep) when card 100A is to be positioned in the second orientation (e.g., when IC 112A detects the second interrogating signal). In some examples, card 100 may be configured to use indicator 166 to provide an alert by causing indicator 166 to cease providing an indication. For example, indicator 166 may provide a first indication (e.g., a light of a first color) when first short-range antenna 110A sends a first signal, and indicator 166 may cease/stop providing the first indication (e.g., no longer emitting the light of the first color) in response to card 100 receiving the second interrogating signal to alert the cardholder to orient card 100 to the second orientation. Each indication may be predetermined, such that a cardholder may understand that a certain indication (e.g., a certain color or noise) as produced by indicator 166 communicates a specific and predetermined status or instruction. In this way, indicator 166 may provide an initial indication to a cardholder, and therein inform the cardholder of an update or alert by altering the manner in which indicator 166 provided the initial indication, whether by actively providing a new indication or ceasing an ongoing indication.

In some examples, indicator 166 may be located near a longitudinal edge 168B, 168D, 170A, 170C of front major surface 160 or back major surface 162, respectively. Locating indicator 166 near a longitudinal edge of a major surface 160, 162 may improve a detectability of indications of indicator 166, as a pocket within a wallet that contains card 100A may be relatively less likely to obscure or muffle indications. Put differently, locating indicator 166 near a longitudinal edge of card 100A may enable a cardholder to read or view or otherwise detect indications of indicator 166 without removing card 100A from the wallet of the cardholder.

In some examples, IC 112A may be configured to cause indicator 166 to produce an indication whenever either short-range antenna 110A, 110B is sending a signal. For example, indicator 166 may be configured to beep anytime either short-range antenna 110A, 110B is transmitting a signal. Configuring IC 112A to cause indicator 166 to produce an indication whenever either short-range antenna 110A, 110B is transmitting a signal may reduce an ability of a malicious entity to surreptitiously skim data of card 100A, as a cardholder may become alerted to the unexpected transmission of card 100A.

Figure 2C:
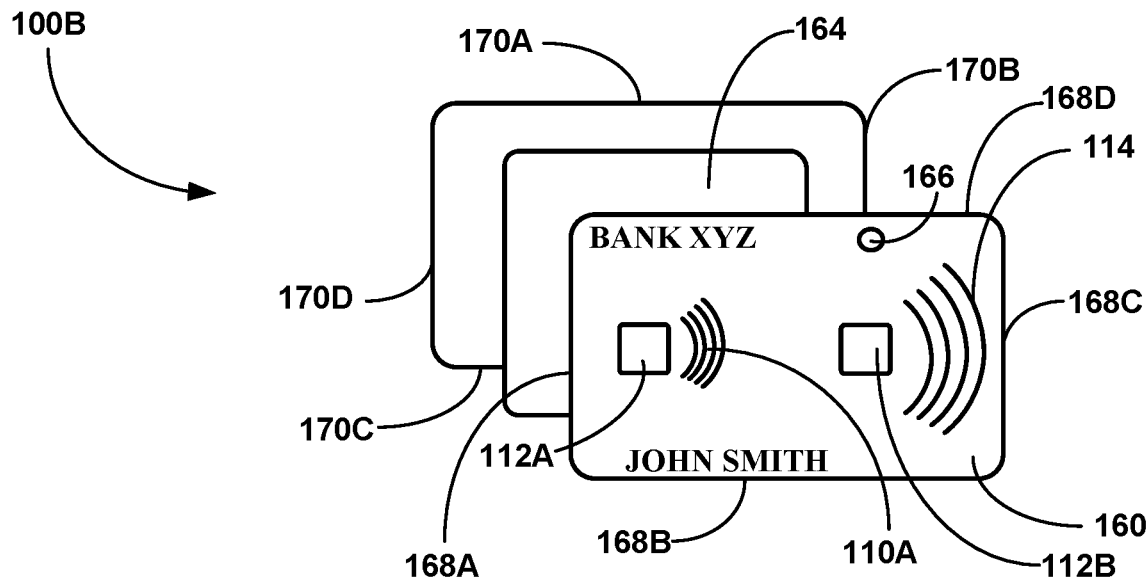
FIGS. 2C and 2D are conceptual and schematic diagrams illustrating an exploded view of the card of FIG. 1 with two short-range antennas and one long range antenna from the front and from the back of the card, respectively, in accordance with the techniques of this disclosure.
Figure 2D:
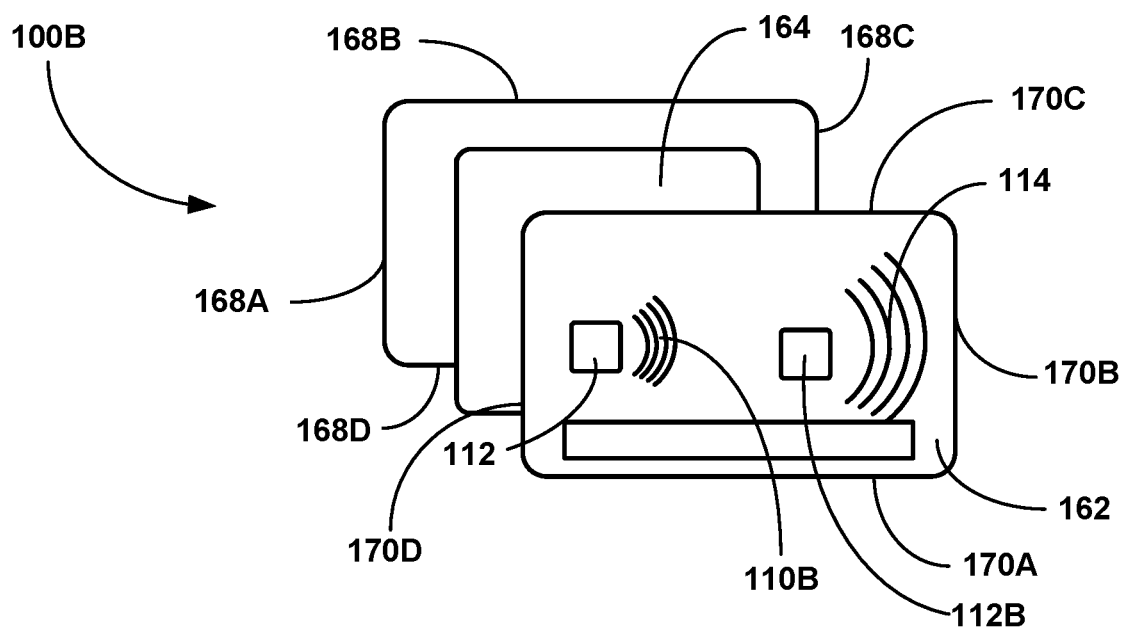

FIGS. 2C and 2D depict conceptual and schematic diagrams of exploded views of an example card 100B from front major surface 160 of card 100B and back major surface 162 of card 100A, respectively. Card 100B may be an example of card 100 of FIG. 1 that utilizes both short-range antennas 110 and long-range antenna 114. Card 100B may be substantially similar to card 100A except for any differences described herein, such as long-range antenna 114 of card 100B. Both the specific shape of card 100B and the specific location of components on card 100B are depicted for purposes of illustration only, as other general shapes or component locations may be used in other examples. For example, card 100B may have less rounded corners and/or a location of long-range antenna 114 and short-range antennas 110 may be switched in other examples.

FIGS. 2C and 2D depict blocking layer 164 between front major surface 160 and back major surface 162. As depicted, blocking layer 164 may extend only partially across card 100B (e.g., such that blocking layer 164 contacts less than all outer edges 168, 170 of front major surface 160 and back major surface 162, respectively). Further, as depicted in FIGS. 2C and 2D, card 100B includes two ICs 112A, 112B (collectively "ICs 112"). Second IC 112B may be configured to cause long-range antenna 114 to transmit predetermined signals, while first IC 112A may be configured to communicate through short-range antennas 110. Though first IC 112A may be visible and extend to at least one major surface 160, 162 of card 100B, second IC 112B may be embedded entirely within card 100B, such that none of second IC 112B extends to either major surface 160, 162. In alternate examples, as discussed herein, both short-range antennas 110 and long-range antenna 114 may be controlled by a single 112, such that second IC 112B may functionally be integrated into first IC 112A.

Long-range antenna 114 may be coupled to second IC 112B and positioned on card 100B at a location where blocking layer 164 is not directly between front major surface 160 and back major surface 162. For example, blocking layer 164 may extend across a first portion of card 100B while long-range antenna 114 is secured to a second portion of card 100B, where the first portion and the second portion do not overlap. As a result of this location, long-range antenna 114 may be configured to receive and transmit signals in substantially all directions. Put differently, card 100B may use long-range antenna 114 in a substantially omnidirectional manner, such that an orientation of card 100B is not a factor when using long-range antenna 114 to receive or transmit signals (so long as long-range antenna 114 is otherwise within its operational range of the target). Though long-range antenna 114 is depicted as being on a substantially opposite side of card 100B relative to short-range antennas 110, in other examples long-range antenna 114 may be relatively closer to one or both short-range antennas 110.

Card 100B may include indicator 166. Either or both ICs 112 may be coupled to indicator 166 and may control outputs (e.g., lights or beeps) of indicator 166. Indicator 166 may provide different indications in response to different events as detected or identified by one or both ICs 112, such as producing lights of different color or different numbers of beeps of different frequencies or durations. For example, indicator 166 may provide a first indication (e.g., a blue color or a first beep) when card 100B is to be positioned in the first orientation (e.g., when IC 112A detects a first interrogating signal), and provide a second indication (e.g., a yellow color or a second beep) when card 100B is to be positioned in the second orientation (e.g., when IC 112A detects the second interrogating signal), and provide a third indication (e.g., a green color or a third beep) when a transaction has been successfully executed (e.g., as received by long-range antenna 114 and detected by IC 112B).

Figure 3:
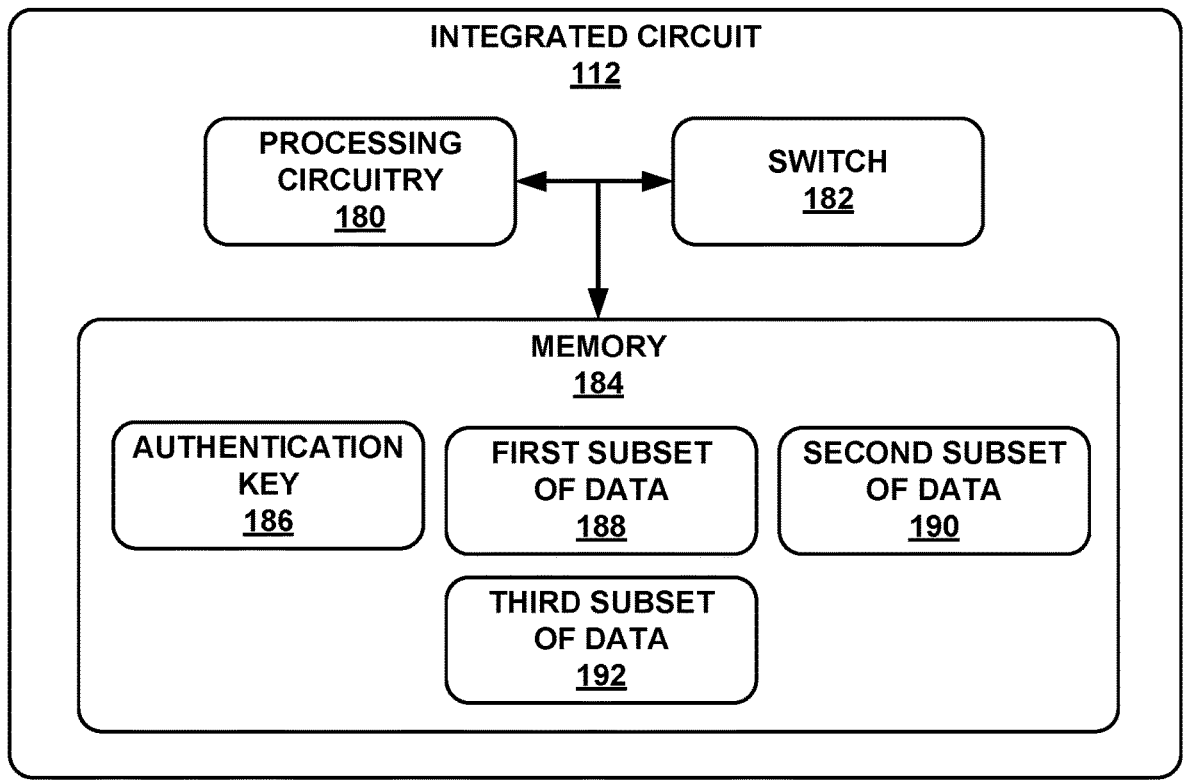
FIG. 3 is a block diagram illustrating an integrated circuit of the card of FIG. 1 in accordance with the techniques of this disclosure.

FIG. 3 depicts a schematic and conceptual diagram of IC 112 of FIG. 1 in accordance with the techniques of this disclosure. IC 112 includes processing circuitry 180, switch 182, and memory 184. The components of IC 112 are coupled (physically, communicatively, and/or operatively) using communication channels for inter-component communications. In some examples, the communication channels may include a system bus or any other method for communicating data. IC 112 may include more or less components in other examples. Processing circuitry 180 may be configured to make determinations and calculations of IC 112 as discussed herein. For example, processing circuitry 180 may be configured to cause indicator 166 to produce a predetermined indication in response to card 100 receiving a signal, such as producing a blue light in response to receiving a first interrogating signal. For another example, processing circuitry 180 may be configured to determine an authentication factor using an authentication key stored on card 100 as part of an authentication process as described herein. While processing circuitry 180 is depicted as a single component in FIG. 3 for purposes of clarity, it is to be understood that in some examples processing circuitry 180 may instead be comprised of a plurality of logic gates.

Switch 182 may be a digital switch. Switch 182 may be configured to enable one of first short-range antenna 110A and second short-range antenna 110B to transmit a signal at a time. Put differently, switch 182 may prevent both short-range antennas 110 from transmitting signals at the same time. For example, switch 182 may include logic gates that enables only one of first short-range antenna 110A or second short-range antenna 110B to couple to IC 112 (and therein memory 184 of IC 112) at a time. In some examples, switch 182 may be a component that is physically externally to the majority of IC 112.

In some examples, switch 182 may be configured to couple a respective short-range antenna 110 to IC 112 and/or memory 184 in response to the contents of the received electromagnetic signal. For example, IC 112 may detect that the received electromagnetic signal (e.g., whether received by either short-range antenna 110) is a first interrogating signal indicating a request for first subset of data 188, in response to which processing circuitry 180 may cause switch 182 to create a signal that includes first subset of data 188 (e.g., and couple a respective short-range antenna 110A to IC 112 in examples where each short-range antenna 110 can only send one predetermined portion of data). For another example, IC 112 may detect that the received electromagnetic signal is a short-range second interrogating signal that includes a random number or variable to be used in determining an authentication factor based on an authentication key stored on card 100. In response to this determination, processing circuitry 180 may cause switch 182 to decouple short-range 110A that transmitted the first signal and couple the alternate short-range antenna 110B, even if the second interrogating signal was detected by short-range antenna 110A that transmitted the first signal.

In other examples, switch 182 may be configured to couple short-range antennas 110 to IC 112 without substantially management by processing circuitry 180. For example, switch 182 may couple the respective short-range antenna 110 that is receiving an electromagnetic signal to IC 112, regardless as to what that electromagnetic signal is. In such an example, first subset of data 188, second subset of data 190, and third subset of data 192 may be stored in substantially physically separate components of memory 184, such that first short-range antenna 110A is only coupled (e.g., through switch 182 and processing circuitry 180) to first subset of data 188, second short-range antenna 110B is only coupled (e.g., through switch 182 and processing circuitry 180) to second subset of data 190, and long-range antenna 114 is only coupled to third subset of data 192.

In this example, if first short-range antenna 110A is receiving an electromagnetic signal, switch 182 may be configured to automatically couple first short-range antenna 110A through processing circuitry 180 to the discrete portion of memory 184 that includes first subset of data 188 (e.g., and not authentication key 186, second subset of data 190, and third subset of data 192) to enable the first short-range antenna 110A to transmit a return signal (e.g., a return signal that includes first subset of data 188). Alternatively, if both short-range antennas 110 are receiving a signal, switch 182 may be configured to couple whichever short-range antenna 110 received its respective signal first. Put differently, if first short-range antenna 110A receives a signal at a time when second short-range antenna 110B is not receiving a signal, switch 182 may be configured to couple first short-range antenna 110A for as long as first short-range antenna 110A continues receiving its signal, regardless as to whether second short-range antenna 110B begins receiving a signal during that time. To continue this example, if at any point first short-range antenna 110A stops receiving its signal while second short-range antenna 110B is receiving a signal, switch 182 may couple second short-range antenna 110B is response to first short-range antenna 110A "losing" its received signal.

Memory 184 may store the data of card 100. For example, memory 184 may store authentication key 186, first subset of data 188, second subset of data 190, and third subset of data 192. First subset of data 188 and second subset of data 190 may include the financial information of card 100 required to make a purchase, while third subset of data 192 may include data generally identifying a cardholder of card (e.g., a name, cell phone number, email address, or identifying number of the cardholder). As depicted, in some examples memory 184 may be a single discrete physical component that stores all of authentication key 186, first subset of data 188, second subset of data 190, and third subset of data 192. Conversely, as discussed herein, in some examples memory 184 may include two or more discrete physical components storing one or more of authentication key 186, first subset of data 188, second subset of data 190, or third subset of data 192.

As such, in some examples, IC 112 is configured such that first short-range antenna 110A is the only antenna that is directly coupled to a discrete portion of memory 184 that stores first subset of data 188, while second short-range antenna 110B is the only antenna that is directly coupled to a discrete portion of memory 184 that stores second subset of data 190, and long-range antenna 114 is the only antenna that is directly coupled to a discrete portion of memory 184 that stores third subset of data 192 (though as described herein, in some examples third subset of data 192 may be stored on a second IC 112B that is only coupled to long-range antenna 114. Put differently, first short-range antenna 110A may be configured to exclusively transmit a signal that includes first subset of data 188, while second short-range antenna 110B may be configured to exclusively transmit a signal that includes second subset 190, etc. Similarly, IC 112 may be configured such that none of first short-range antenna 110A, second short-range antenna 110B, or long-range antenna 114 is directly coupled to a discrete portion of memory 184 that stores authentication key 186. Rather, IC 112 may be configured such that processing circuitry 180 that uses authentication key 186 to create an authentication factor is coupled to a portion of memory 184 that stores authentication key 186 (e.g., such that processing circuitry 180 then provides the authentication factor to a respective short-range antenna 110 for transmission).

Figure 4:
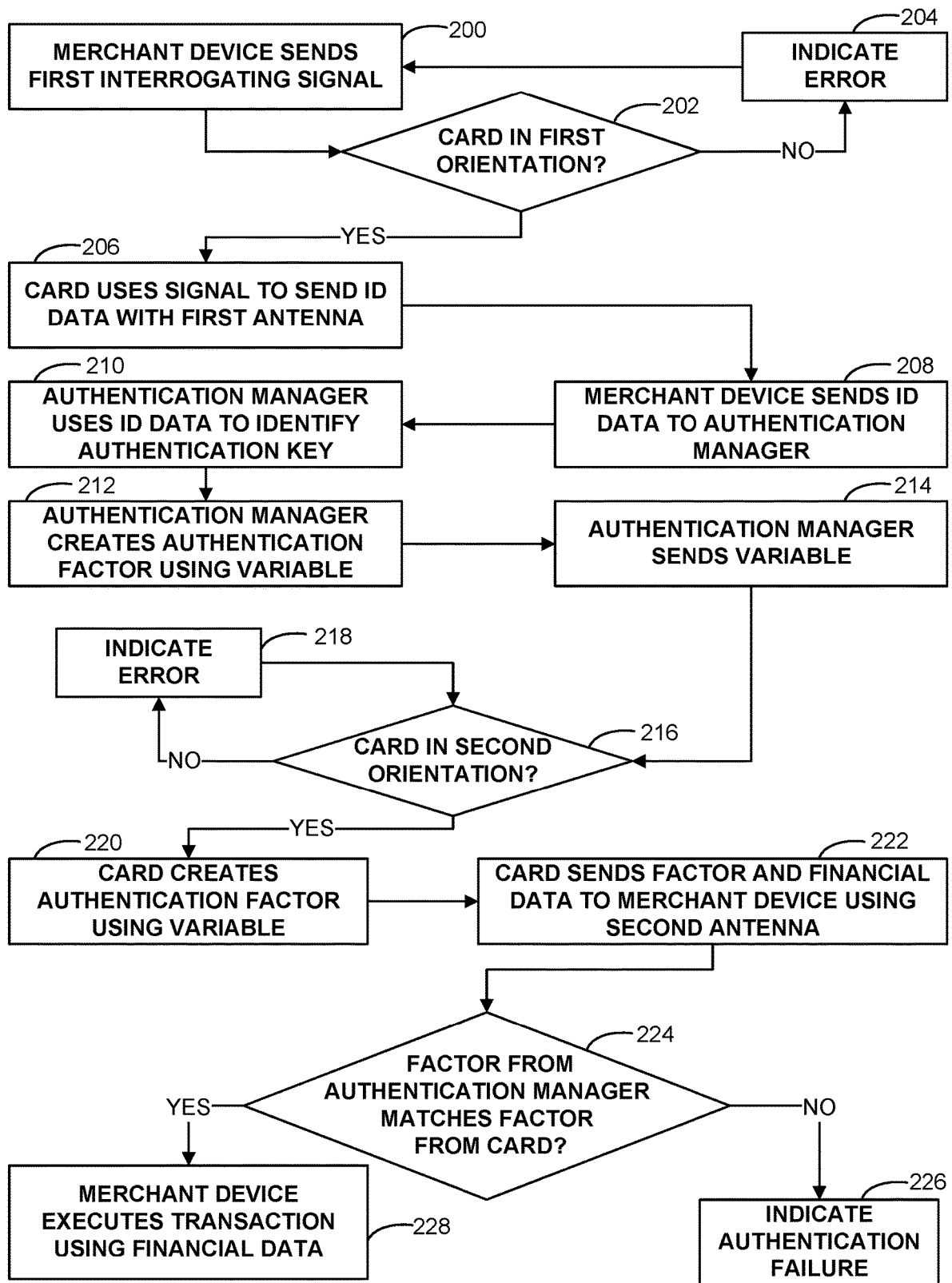
FIG. 4 is a flowchart illustrating an example method of securing transactions completed with the card of FIG. 1 in accordance with the techniques of this disclosure.

FIG. 4 is a flowchart illustrating an example method of authenticating card 100 in order to execute transactions in accordance with the techniques of this disclosure. While the method of FIG. 4 is discussed using the reference numerals of FIGS. 1-3, it is to be understood that different devices and entities may be used within the method described herein in different examples. Merchant device 130 sends a first interrogating signal (200). Merchant device 130 may pseudo-constantly send the first interrogating signal. In certain examples, long-range antenna 114 of card 100 may detect the first interrogating signal, in response to which indicator 166 may produce an indication for the cardholder to position card 100 in a first orientation, though in other examples indicator 166 may not produce an indication until short-range antennas 110 receive and/or send a signal. The first orientation may simply include orienting card 100 with either major surface 160, 162 facing merchant device 130 (e.g., such that a second orientation would require the respective alternate major surface 162, 160 facing the merchant device 130), though the method of FIG. 4 is discussed and depicted using examples where the first orientation requires a predetermined major surface 160 facing merchant device 130.

IC 112 may determine if card 100 is in the first orientation (202). IC 112 may determine if card 100 is in the first orientation by identifying if first short-range antenna 110A is receiving the first interrogating signal. If card 100 is not in the first orientation, an error indication may be provided (204). Indicator 166 may produce the error indication. Alternatively, or additionally, display 136 of merchant device 130 may provide an indication that card 100 is not in the first orientation (e.g., as a result of merchant device 130 not receiving the expected information as discussed herein, display 136 of merchant device 130 may display "please reverse your card" or "please change the orientation of your card"). For example, indicator 166 may produce a red light while a display of merchant device 130 presents a message "PLEASE PRESS FRONT SIDE OF CREDIT CARD HERE" (e.g., with an arrow pointed at antenna 134). As depicted in FIG. 4, these error indications may continue being presented until card 100 is in the first orientation or merchant device 130 stops transmitting the first interrogating signal.

Once card 100 is in the first orientation, first short-range antenna 110A uses interrogating signal to send first subset of data 188 (206). First subset of data 188 may include identifying information of the cardholder (e.g., a name of the cardholder or a financial username of the cardholder). Alternatively, or additionally, first subset of data 188 may include financial data of the cardholder, such as an account number of a checking account of the cardholder. Merchant device 130 may receive the first signal of card 100 with first subset of data 188. Merchant device 130 may transmit some or all of first subset of data 188 to authentication manager 152 of the financial institution of the card 100 (208). Merchant device 130 may transmit first subset of data 188 to authentication manager 152 via roaming server 138 as discussed herein. Authentication manger 152 may use the received first subset of data 188 to identify the respective authentication key 154 of card 100 (210).

Once authentication manager 152 identifies authentication key 154 of card 100, authentication manager 152 may use authentication key 154 to create an authentication factor (212). For example, authentication manager 152 may use the authentication key to execute a procedure that includes a random number or variable to create the authentication factor. The variable may be a number and the procedure may include a mathematical procedure such as a multiplication, addition, or factorial procedure. Alternatively, the variable may be a series of characters, and the procedure may be a simple appendage or substitution procedure wherein the variable is appended to or substituted for a portion of the authentication key. Other types of variables and procedure are also possible.

Authentication manager 152 may transmit the variable over network 140 (214). Authentication manager 152 may transmit the variable to merchant device 130 via roaming server 138, in response to which merchant device 130 may send a second interrogating signal to card 100. In some examples, indicator 166 of card may produce a light of a certain color when card 100 transmits first signal to merchant device 130 (e.g., at step 206) and indicator 166 may stop producing this light or otherwise alter the color of the light when card 100 detects the second interrogating signal. The second interrogating signal may include the variable. Display 136 of merchant device 130 and/or indicator 166 may produce an indication that card 100 should be repositioned into the second orientation. IC 112 may determine if card 100 is in the second orientation (216). IC 112 may determine if card 100 is in the second orientation by identifying if second short-range antenna 110B is receiving the second interrogating signal. If card 100 is not in the second orientation, an error may be indicated. For example, as discussed herein, display 136 of merchant device 130 may display a message such as "please reverse your card" or "please change the orientation of your card," or indicator 166 of card 100 may indicate the error with a predetermined light or noise. (218). Indicator 166 and/or display 136 of merchant device 130 may indicate this error as described herein. These error indications may continue being presented until card 100 is in the second orientation or merchant device 130 stops transmitting the second interrogating signal.

Once card 100 is in the second orientation, IC 112 may use authentication key 186 stored locally on memory 184 to create the authentication factor (220). IC 112 may create the authentication factor with the variable received within the second interrogating signal. In some examples, the procedure used by both card 100 and authentication manager 152 is predetermined, such that the procedure does not change between authentication instances. For example, execution of the procedure by IC 112 may be substantially hard-wired into logic of processing circuitry 180, such that IC 112 always creates and transmits (e.g., using second short-range antenna 110B) an authentication factor per a portion of a received interrogating signal in response to short-range antennas 110 receiving the interrogating signal. In such examples, the variable may change between authentication instances. For example, authentication manager 152 may create a new and substantially unique variable each time authentication manager 152 receives a new set of identifying information as transmitted by merchant device 130.

Card 100 may transmit the authentication factor to merchant device 130 along with second subset of identifying data 190 (222). Card 100 may send the authentication factor and second subset of identifying data 190 in a second signal using second short-range antenna 110B. Second subset of identifying data 190 may be financial data or personal data relating to the cardholder. Second subset of identifying data 190, in conjunction with first subset of identifying data 188, may be sufficient for merchant device 130 to process a transaction.

Merchant device 130 may transmit the authentication factor from card 100 to authentication manager 152 (e.g., via roaming server 138) as described herein. Authentication manager 152 may determine if the authentication factor from card 100 matches its own authentication factor (224). Authentication manager 152 may inform merchant device 130 (e.g., via roaming server 138) as to whether or not the transaction is authorized (e.g., as a result of card 100 being authenticated).

Alternatively, in certain examples, card 100 may not transmit the authentication factor and second subset of identifying data 190 to merchant device 130 in a single transmission using second short-range antenna 110B. Instead, card 100 may only send the authentication factor to merchant device 130 using second short-range antenna 110B in a transmission (e.g., at step 222) in response to receiving the second interrogating signal of merchant device 130 (e.g., at step 220). In these examples, card 100 may transmit second subset of identifying data 190 to merchant device 130 in response to authentication manager 152 successfully authenticating card 100. For example, once authentication manager 152 authenticates card 100, authentication manager 152 may inform merchant device 130 of such successful authentication so that merchant device 130 may transmit a subsequent interrogating signal to card 100 that indicates this successful authentication. In response to this subsequent interrogating signal, card 100 may transmit second subset of identifying data 190, which may be used by merchant device 130 to execute a transaction as described herein. In this way, system 101 may be configured such that merchant device 130 only receives sufficient data to execute a transaction (e.g., both first subset of identifying data 188 and second subset of identifying data 190) in response to authentication manager 152 successfully authentication card 100 as described herein.

If authentication manager 152 determines that the two authentication factors do not match, authentication manager 152 may transmit a message to merchant device 130 (e.g., via roaming server 128) indicating that the transaction is not authorized, in response to which indicator 166 may indicate that the authentication failed (226). In some examples, as a result of the authentication failure, merchant device 130 may decline and/or deny the transaction. Merchant device 130 and/or indicator 166 may produce the indication communicating this authentication failure. If authentication manager 152 transmits a message to merchant device 130 (e.g., via roaming server 138) indicated that the transaction is authorized (e.g., as a result of matching authentication factors), merchant device 130 may use first subset of data 188 and second subset of data 190 to execute a transaction (228). In some examples, merchant device 130 may transmit details of the transaction (e.g., merchant identification, transaction identification, purchase amount, purchase items) to authentication manager 152 (e.g., through roaming server 138) in order to complete the transaction (e.g., actually draw the funds from the financial institution of card 100). Once the transaction is completed by authentication manger 152 (e.g., by causing funds of the cardholder stored by the financial institution to be transferred to the merchant), the authentication manager 152 may route a "success" message to merchant device 130 that is relayed to card 100 (e.g., causing indicator 166 to indicate this success).

Figure 5:
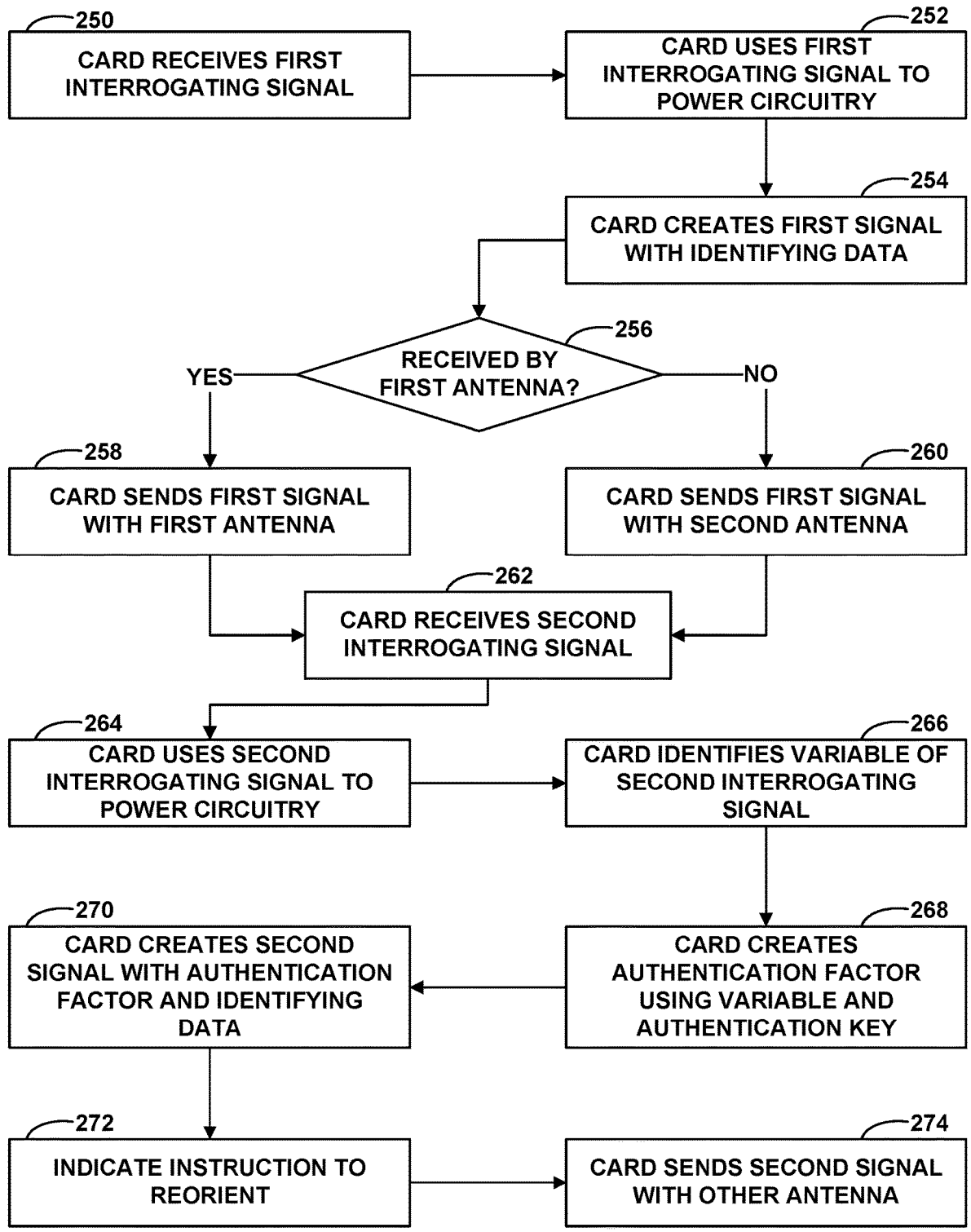
FIG. 5 is a flowchart illustrating an example method of a card receiving and using electromagnetic signals in order to transmit electromagnetic signals.

FIG. 5 is a flowchart illustrating a method of card 100 processing interrogating electromagnetic signals to create and send signals. The method of FIG. 5 may start when card 100 receives a first interrogating signal (250). The first interrogating signal may be received by one of short-range antennas 110 of card 100. Card 100 may use the electromagnetic field of the first interrogating signal to power circuitry of card 100 (252). For example, card 100 may use the electromagnetic field to power processing circuitry 180 of IC 112 of card 100. Once IC 112 has drawn sufficient power from the electromagnetic field, IC 112 may create a first signal with first subset of data 188 (254). First subset of data 188 may include a subset of data sufficient for authentication server 150 to identify a cardholder of card 100.

IC 112 may identify which of the two short-range antennas 110 received the first interrogating signal (256). If IC 112 identifies that first short-range antenna 110A received the first interrogating signal, IC 112 may cause first short-range antenna 110A to transmit a first signal with first subset of data 188 (258). If IC 112 identifies that second short-range antenna 110B received the first interrogating signal, IC 112 may cause second short-range antenna 110B to transmit the first signal with first subset of data 188 (260).

Once authentication manager 152 provides an authentication factor to merchant device 130 (e.g., via roaming server 138), merchant device 130 may transmit a second interrogating signal to card 100. Granted that card 100 is still within the operational range of merchant device 130, card 100 will receive the second interrogating signal of merchant device 130 (262). Card 100 may use the electromagnetic field of the second interrogating signal to power circuitry of card 100 (264). Once sufficiently powered, IC 112 may identify the variable of the second interrogating signal (266). IC 112 may use this variable and authentication key 186 of card 100 to create a unique authentication factor (268). IC 112 may further use the power of the electromagnetic field to create a second signal that includes both the authentication factor and second subset of data 190 (270).

IC 112 may cause indicator 166 to provide an indication to reorient card 100 to the second orientation (272). In some examples, IC 112 may cause indicator 166 to provide an indication to reorient card 100 immediately upon drawing enough power from the second interrogating signal to do so. IC 112 may cause the other short-range antenna 110 to transmit the second signal with the authentication factor and second subset of data 190 (274). For example, if IC 112 identified that first short-range antenna 110A received first interrogating signal (e.g., at 256) and therein caused first short-range antenna 110A to transmit a first signal, IC 112 may cause second short-range antenna 110B to transmit the second signal. Alternatively, if IC 112 identifies that second short-range antenna 110B received the first interrogating signal and then transmitted the first signal, then IC 112 may cause first short-range antenna 110A to transmit the second signal.

Alternatively, as discussed above, in certain examples the second signal as created and transmitted by card 100 in response to receiving the second interrogating signal may only include the authentication factor (e.g., and not include second subset of identifying data 190). For example, card 100 may create a third signal that includes the second subset of identifying data 190 in response to receiving a subsequent interrogating signal that indicates a successful authentication of card 100. Once created, card 100 may transmit this third signal that includes second subset of identifying data 190, which may be used by merchant device 130 to execute a transaction as described herein. In this way, card 100 may be configured such that card 100 only transmits sufficient data to execute a transaction (e.g., both first subset of identifying data 188 and second subset of identifying data 190) in response to receiving verification that card 100 has been authenticated as described herein.

Figure 6:
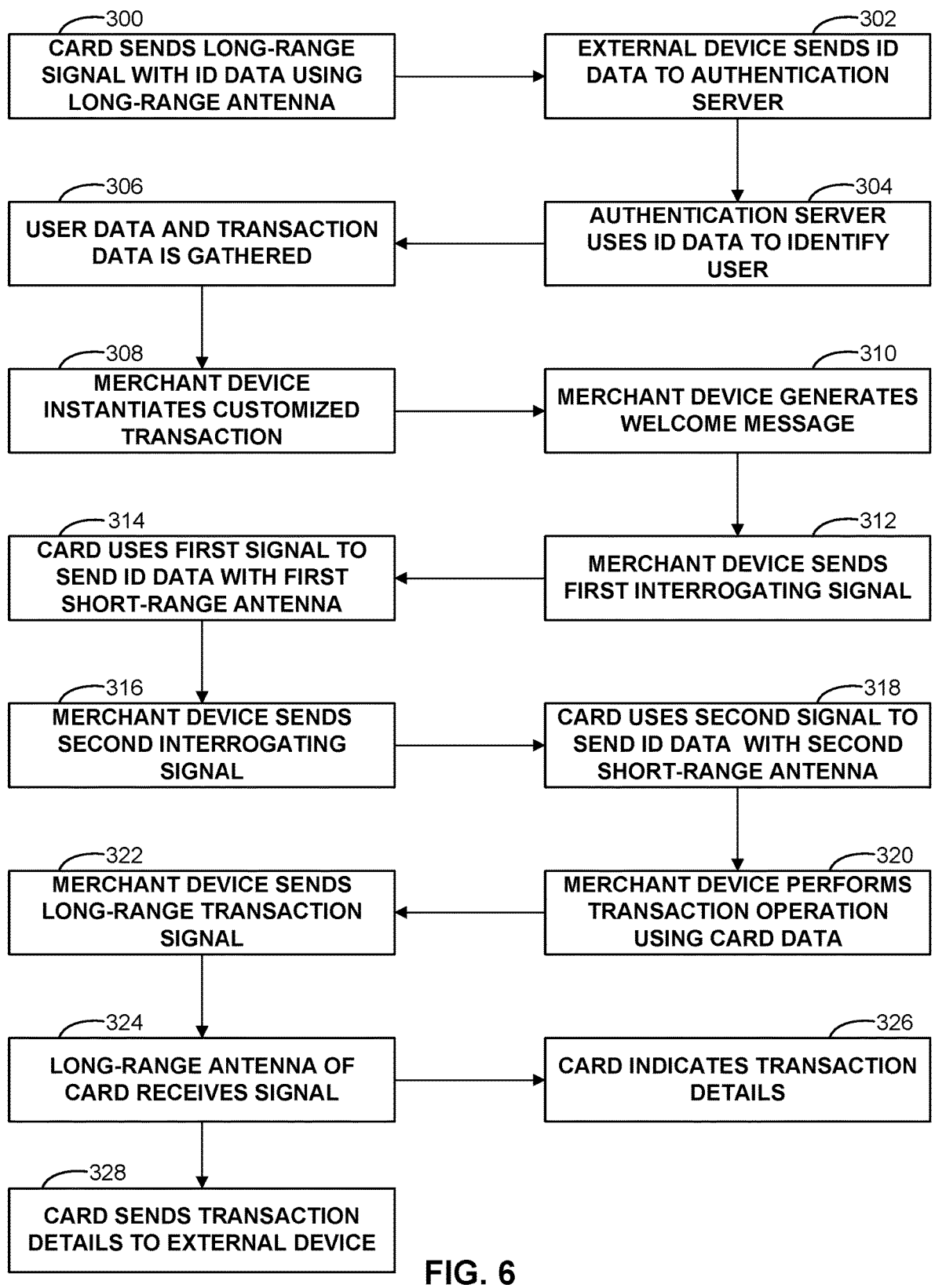
FIG. 6 is a flowchart illustrating an example method of using both a long-range antenna and a short-range antenna to execute a transaction with the card of FIG. 1 in accordance with the techniques of this disclosure.

FIG. 6 is a flowchart illustrating a method of using long-range antenna 114 of card 100 when executing transactions with card 100 in accordance with the techniques of this disclosure. The method of FIG. 6 may begin with card 100 transmitting a long-range signal with some identifying data using long-range antenna 114 (300). The identifying data may include third subset of data 192. Third subset of data 192 may include information such as a cell phone number, email address, rewards number, or name of the cardholder. In some examples, card 100 may transmit the long-range signal in response to receiving an instantiating signal from a first external device 120A. Card 100 may be configured to use the electromagnetic field of the instantiating signal to power the long-range signal.

External device 120A may receive the long-range signal from card 100 transmitted by long-range antenna 114. As received by external device 120A, data of the long-range signals may be encrypted. To decrypt the long-range signals, external device 120A may send the identifying third set of data 192 from card 100 to roaming server 138, which may then connect to authentication server 150 over network 140 to provide the encrypted third set of data 192 to authentication manager 152 (302). In this way, third set of data 192 may be routed through a plurality of devices and networks (e.g., roaming server 138 and network 140) in order for authentication server 150 to receive the identifying data. Once authentication manager 152 of authentication server 150 receives third set of data 192, authentication manager 152 may identify the cardholder and send the cardholder identity to external device 120A via roaming server 138 (304).

Data on the cardholder and on a potential transaction may be gathered (306). Cardholder data may include reward program details, pictures, preferred nicknames of the cardholder, or the like. Transaction details may include current pricing schedules, current deals, or the like. This data may be gathered by roaming server 138. Alternatively, or additionally, this data may be gathered by external devices 120 or merchant device 130 or a combination of the three. This data may be gathered from a number of local and remote data stores (e.g., servers) of the merchant and/or financial institution.

Purchase controller 132 of merchant device 130 and/or roaming server 138 may instantiate a customized transaction for the cardholder using this data (308). Instantiating the customized transaction may include identifying a rewards program of the cardholder (e.g. a program between the cardholder and the merchant that owns or manages the merchant device 130) and instantiating a transaction that utilizes the rewards program. Instantiating a transaction that utilizes the rewards program may include determining a discount to be applied to any eventual transaction or identifying a reward account to which reward "points" will be applied to in response to any eventual transaction. Instantiating the customized transaction may further include gaining access to or otherwise establishing connections with any remote entities or data that may be used to execute an eventual transaction. For example, in response to the long-range signal from card 100 that identifies the cardholder, merchant device 130 and/or roaming server 138 may open a channel of communication with authentication server 150 to expedite any future authentication that may take place as part of a future transaction. In some examples, authentication manager 152 may have sufficient information from the long-range signal to identify the cardholder and create the variable and authentication factor as discussed herein, such that merchant device 130 may already have received both by or before the time that merchant device 130 receives a first signal from either short-range antenna 110.

Alternatively, or additionally, instantiating the customized transaction may include providing a welcome message to a cashier utilizing merchant device 130 or generating on display 136 of merchant device 130 the welcome message on merchant device 130 (310). This welcome message may use identifying data from the long-range signal to identify further programs or products that may apply to the cardholder. For example, if the long-range signal included data that indicated that the cardholder was a rewards-member named Sarah Smith and that today was her birthday, merchant device 130 may produce (e.g., with a customer-facing display) a message to the cardholder stating, "Welcome back and happy birthday, Sarah! We are ready to apply your discount today. Also, all candy bars are 50% for you today in honor of your birthday, if you want to treat yourself!" Other messages and uses of identifying information are also possible.

Merchant device 130 may send first interrogating signal (312). In some examples, first interrogating signal may be the instantiating signal in response to which card 100 sends a long-range signal using long-range antenna 114 (e.g., such that card 100 is configured to transmit a different signal when long-range antenna 114 receives the first interrogating signal than when short-range antenna 110A receives the same first interrogating signal). In other examples, first interrogating signal may be different than instantiating signal. Merchant device 130 may transmit first interrogating signal in response to receiving long-range signal from card 100. As discussed herein, IC 112 may identify if card 100 is positioned in the first orientation and indicate an error if card 100 is not, potentially continually indicating an error until card 100 is in the first orientation or merchant device 130 stops transmitting the first interrogating signal. If IC 112 determines that card 100 is in a first orientation (e.g., with either first short-range antenna 110A or second short-range antenna 110B within an operational distance of merchant device 130), IC 112 may cause the respective short-range antenna to transmit first subset 188 of identifying data to merchant device 130 (314).

Merchant device 130 may receive first subset of identifying data 188. In some examples, merchant device 130 may communicate with authentication manager 152 via roaming server 138 as discussed herein to authenticate card 100. Further, where merchant device 130 communicated with authentication manager 152 via roaming server 138 upon receiving an initial long-range signal as described herein (e.g., as at step 302), merchant device 130 may receive authentication information through roaming server 138 from authentication manager 152 relatively faster than if authentication manager 152 was sent a first identifying information subsequent to merchant device 130 receiving the first signal from first short-range antenna 110A.

Merchant device 130 may send a second interrogating signal to card 100 (316). The second interrogating signal may be different than the first interrogating signal. For example, as discussed above, the second interrogating signal may include a variable that IC 112 may use to create an authentication factor so that authentication manager 152 may authenticate card 100. In other examples, the second interrogating signal may be substantially similar to the first interrogating signal.

IC 112 may then cause the alternate short-range antenna 110 to transmit a signal that includes second subset of identifying data 190 to merchant device 130 (318). The signal from card 100 transmitted by the respective short-range antenna 110 may also include the authentication factor as discussed herein. Merchant device 130 may then use first subset 188 and second subset 190 of identifying data to perform a transaction operation (320). The transaction operation may include "running" card 100 as the merchant attempts to draw funds from the financial institution of card 100 (e.g., as an authorized card as authentication by authentication manager 152 may still have insufficient funds to complete a transaction).

Merchant device 130 may gather data on the transaction operation. For example, merchant device 130 may compile a final cost of the transaction and a list of all fees and products that were included in the transaction, as well as a date and time at which the funds were successfully drawn from the financial institution. In other examples, merchant device 130 may detect that an attempt to email a receipt to the cardholder was unsuccessful. For example, an email address as gathered from an initial long-range signal from long-range antenna 114 (e.g., as sent in step 300 of the method of FIG. 5) and decrypted by authentication server 150 may be used by merchant device 130 to email a receipt that reflects these transactional details (e.g., merchant identification, transaction identification, good purchase, etc.) to cardholder. However, upon utilizing this email address as received in the long-range signal and decrypted by authentication server 150 to email a receipt, merchant device 130 may detect that the emailed receipt bounced back to merchant device 130. In response to this detection, merchant device 130 may determine that at least one portion of the transaction operation was unsuccessful.

Merchant device 130 may send a long-range electromagnetic receipt signal to card 100 including these details (324). Long-range antenna 114 of card 100 may receive this long-range signal. In some examples, neither short-range antenna 110A, 110B may receive the long-range signal as a result of the merchant device 130 being outside of the operational range of both short-range antennas 110 (e.g., as a result of the cardholder moving card 100 away from merchant device 130 after card 100 sends second signal to merchant device 130). In certain examples, IC 112 may cause indicator 166 to indicate certain details of this long-range signal (326). For example, IC 112 may identify that the long-range signal indicated that there was an error within the transaction (e.g., as a result of an email failing to reach the cardholder), or IC 112 may determine that the transaction was completely successful and may indicate as much. In some examples, IC 112 may cause long-range antenna 114 to transmit some of all of these details to a second example external device 120B that is owned or related to the cardholder, such as a cell phone of the cardholder (328). Enabling transactional details to be routed to the cardholder through card 100 rather than through an email or phone number of cardholder may enable the cardholder to remain relatively anonymous to the merchant during the transaction. In some examples, merchant device 130 may send this long-range electromagnetic receipt signal even when short-range antennas 110 of card 100 were not used to execute the transaction (e.g., when a magnetic strip of card 100 was used to execute a transaction, or when card 100 was inserted into a card-reader to execute a transaction).

Figure 7:
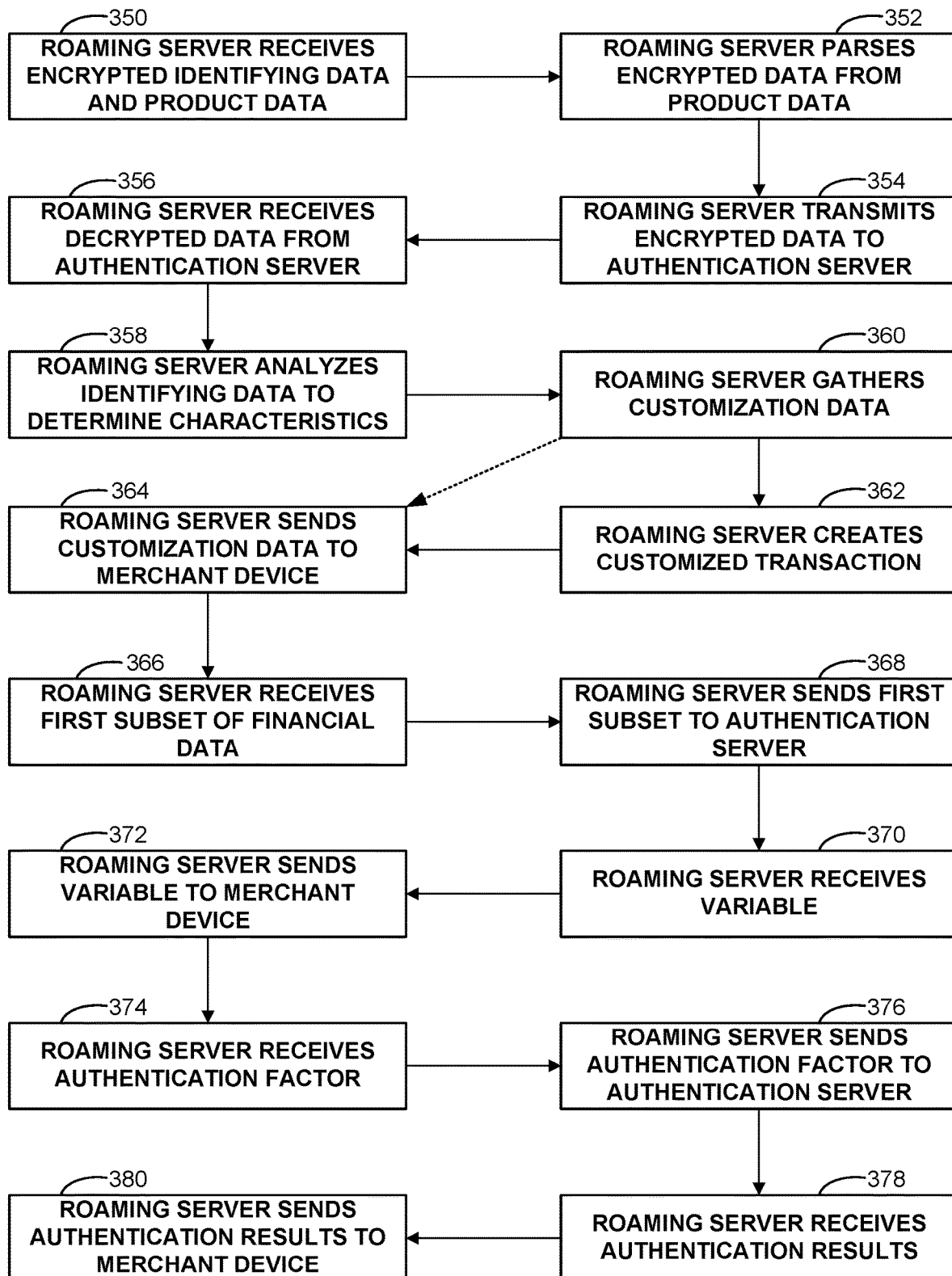
FIG. 7 is a flowchart illustrating an example method of using a roaming server to instantiate and execute a transaction with the card of FIG. 1 in accordance with the techniques of this disclosure.

FIG. 7 is a flowchart illustrating an example method of using roaming server 138 to instantiate and execute a transaction with the card of FIG. 1 in accordance with the techniques of this disclosure. Though FIG. 7 is predominantly discussed with reference to the component of FIG. 1, it is to be understood that the example method of the flowchart of FIG. 7 may be executed with other roaming servers 138 in a different system 101 with more or less or different components. The method may begin with roaming server 138 receiving a set of identifying data (e.g., third set of data 192) that is in an encrypted format along with a set of product information (350). The encrypted format may be such that roaming server 138 may not be able to determine the unencrypted state of the set of identifying data (hereinafter referred to as identifying data) or otherwise use the identifying data so long as identifying data is in the encrypted format. In some examples, roaming server 138 may be configured to determine whether or not the received identifying data is in the encrypted format (e.g., by determining whether or not roaming server 138 may read the identifying data). In some examples, roaming server 138 may receive the identifying data from external devices 120, whereas in other examples roaming server 138 may receive the identifying data from merchant device 130. Roaming server 138 may identify and log a source of identifying data for future use as described herein.

In some examples, in addition to the encrypted identifying data, roaming server 138 may receive product information from the respective external device 120 or merchant device 130 that sent the encrypted identifying data. For example, where roaming server 138 received the encrypted identifying data from external device 120A, external device 120A may send the encrypted identifying data (e.g., as received by a long-range signal from card 100) to roaming server 138 along with products associated with external device 120A (e.g., clothing if external device 120A is in a clothing store, or parking if external device 120A is in a parking ramp, or rental units if external device 120A is in a future resident parking spot at an apartment complex). Alternatively, external device 120A may send roaming server 138 a location or unique identifying of external device 120A, where roaming server 138 has a record of external device 120A and may independently identify or determine products that are associated with external device 120A. External device 120A may send additional gathered or stored information to roaming server 138 in other examples.

Where roaming server 138 received both encrypted identifying data and product information, roaming server 138 may parse the encrypted identifying data from the product information. For example, a single transmission (e.g., from external device 120A) may include both the encrypted identifying data and the product information, and roaming server 138 may identify the encrypted identifying data from the single transmission such that the encrypted identifying data may therein be sent and/or handled independently of the product information. In other examples, the encrypted identifying data may be sent (e.g., by external device 120) in a separate transmission, such that this parsing may be unnecessary.

Roaming server 138 may transmit the parsed encrypted identifying data to authentication server 150 (354). Where roaming server 138 received other non-encrypted information along with the encrypted identifying data (e.g., product or location data as described herein), roaming server 138 may only send along the portion of received data that is encrypted (e.g., the encrypted identifying data from card 100 rather than the product or location data as transmitted by merchant device 130 or external device 120). In some examples, roaming server 138 may analyze the encrypted identifying data to determine which identification server 150 to transmit the encrypted identifying data to, in systems 101 where different cards 100 may relate to different authentication servers 150. For example, roaming server 138 may identify a particular manner in which the identifying data is encrypted and correlate that particular manner with a given authentication server 150 in examples where different encryption styles relate to different authentication servers 150.

Roaming server 138 may transmit the encrypted identifying data to authentication server 150 over network 140. In some examples, roaming server 138 may route the identifying data through one or more networks 140 and one or more servers before the encrypted identifying data arrives at authentication server 150. In certain examples, roaming server 138 may be configured to route the encrypted identifying data to authentication manager 152, though in other examples roaming server 138 may be configured to route the encrypted identifying data to a different module or component of authentication server 150. Alternatively, roaming server 138 may be configured to route the encrypted identifying data to servers of the financial institution other than authentication server 150 (not depicted) in examples where separate servers provide the services of decrypted identifying information and authentication financial information of card 100. In examples where roaming server 138 is configured to determine whether the received data is encrypted, roaming server 138 may be configured to transmit the encrypted identifying data to authentication server 150 in response to determining that the received identifying data is in the encrypted format. Alternatively, roaming server 138 may receive the identifying data from external devices 120 and/or merchant device 130 with a request to transmit the identifying data to authentication server 150, such that roaming server 138 makes few or no decisions or determinations before transmitting the identifying data to authentication server 150.

Roaming server 138 may receive the identifying data in a decrypted format (356). The decrypted format may be such that the roaming server 138 (e.g., and other computing devices such as external devices 120 and/or merchant device 130) may be able to read and otherwise use or manipulate the identifying data. Once roaming server 138 identifies or detects that the identifying data as received is in the decrypted format, roaming server 138 may analyze the identifying data to determine identifying characteristics of the identifying data (358). Identifying characteristics may include such information as a name, card 100 type, product, account number, data, time, or the like. For example, roaming server 138 may determine a set of identifying characteristics that included a customer name of Cathy Jones, card 100 type of an airline perks card 100, a product of a parking spot (e.g., using product information as sent by external device 120A), an account number that the cardholder has with the financial institution, and an account number that the cardholder has with the merchant. Roaming server 138 may use both the identifying information and the product information to determine the identifying characteristics.

Roaming server 138 may gather customization data (360). Customization data may be data that relates to one or more identifying characteristics. Roaming server 138 may gather customization data from one or more repositories. For example, repositories may include servers or memory banks associated with the merchant, financial institution, or other organizations. Further repositories may be accessed over network 140, or roaming server 138 may be directly connected/coupled to repositories.

For example, roaming server 138 may use the cardholder's financial institution account number and a repository of the financial institution (e.g., a public server or server that is otherwise accessible to roaming server 138 over network) to identify notices or alerts or programs from the financial institution that are relevant to the cardholder. Further, roaming server 138 may use product information and the cardholder's account number with the merchant to identify discounts that relate to the product or are available to the cardholder or both.

In some examples, using this customization data, roaming server 138 may create a customized transaction (362). The customized transaction may include a customized message for the cardholder that includes personalized details for the cardholder and is displayed directly to the cardholder (e.g., a visual message including a name or nickname of the cardholder and displaying alerts, notices, or possible deals that have been identifying as relating to the cardholder). Further, the customized transaction may include pricing details for the cardholder (e.g., as relating to the products or the accounts of the cardholder).

Roaming server 138 may transmit the customization data to merchant device 130 (364). In examples where roaming server 138 also created a customized transaction, roaming server 138 may also send the customized transaction to merchant device 130. Where roaming server 138 recorded that the encrypted identifying data initially came from a respective external device 120, roaming server 138 may additionally (or alternatively) transmit the customization data to the respective external device 120. In response to transmitting the customization data to the respective external device 120, roaming server 138 may receive a cardholder input as gathered by the respective external device 120, which roaming server 138 may use to further customize the customized transaction and/or transmit to merchant device 130.

Roaming server 138 may receive a message (e.g., a packet or a communication signal) from merchant device 130 that includes a first subset of financial data (e.g., first subset of data 188) (366). The first subset of financial data may include data that the financial institution may use to identify the cardholder. Roaming server 138 may analyze the message and determine that the message includes the first subset of financial data. Roaming server 138 may transmit this first subset of financial data to authentication server 150 (368). Roaming server 138 may transmit the first subset of financial data to authentication server 150 in response to determining that the first message including the first subset of financial data.

Roaming server 138 may receive a message from authentication server 150 that includes a variable as described herein (370). Roaming server 138 may identify that this message from authentication server 150 includes the variable. Roaming server 138 may transmit this variable to merchant device 130 in response to determining that the message included the variable (372). Roaming server 138 may then receive a message that includes an authentication factor from merchant device 130 (374). Roaming server 138 may identify that the message includes the authentication factor, in response to which roaming server 138 may transmit to the authentication factor to authentication server 150 (376).

Roaming server 138 may receive a message that includes authentication results from authentication server 150 (378). Authentication results may include a notice indicating that card 100 has successfully been authenticated or a notice that authentication manager 152 has been unsuccessful at authenticating card 100 (e.g., as a result of mismatching authentication factors as described herein). Roaming server 138 may analyze this message and therein determine that the message includes the authentication results. Roaming server 138 may transmit these authentication results to merchant device 130 (380). In response to receiving these results, merchant device 130 may execute the transaction, which may include running the card and attempting to draw funds from the respective financial account of the cardholder with the financial institution. In some examples, authentication server 150 may provide a message to roaming server 138 as to whether or not these funds have been successfully pulled from the respective financial account. In these examples, roaming server 138 may transmit this message to merchant device 130, which may then present such a message using a respective display 136.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over a computer-readable medium as one or more instructions or code, and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry, as well as any combination of such components. Accordingly, the term "processor," as used herein may refer to any of the foregoing structures or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless communication device or wireless handset, a microprocessor, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Techniques of this disclosure may provide one or more technical advantages. For example, certain techniques of this disclosure may, in some instances, provide a technical solution to securing debit or credit cards. For example, a card may include a plurality of RF antennas that each transmit a portion of the information needed to execute a transaction. The antennas may be configured to transmit signals in different directions using a blocking layer that extends between the antennas. Further, the card may include a long-range antenna that is configured to increase an ability of the card to enable businesses to welcome and communicate with the cardholder.

Various examples have been described. These and other examples are within the scope of the following claims.

What is claimed is:

1. A system comprising:
   a card that defines a first major surface and a second major surface, wherein the first major surface and the second major surface are on opposing sides of the card;
   a first integrated circuit secured to the card that stores a first set of identifying data as a first subset and a second subset;
   a second integrated circuit secured to the card that stores a second set of identifying data;

a first short-range antenna secured to the card and electrically coupled to the first integrated circuit, wherein the first integrated circuit is configured to cause the first short-range antenna to transmit a first signal based on the first subset of the first set of identifying data through the first major surface in response to the first short-range antenna receiving a first interrogating electromagnetic signal;

a second short-range antenna secured to the card and electrically coupled to the first integrated circuit, wherein the first integrated circuit is configured to cause the second short-range antenna to transmit a second signal based on the second subset of the first set of identifying data through the second major surface in response to the second short-range antenna receiving a second interrogating electromagnetic signal;

a blocking layer that extends within a first portion of the card between the first major surface and the second major surface, wherein the blocking layer is configured to block electromagnetic signals between the first short-range antenna and the second short-range antenna; and a long-range antenna secured to the card at a second portion of the card that does not overlap with the first portion of the card, the long-range antenna electrically coupled to the second integrated circuit, wherein the second integrated circuit is configured to cause the long-range antenna to transmit a third signal based on the second set of identifying data in response to receiving a third interrogating electromagnetic signal.

2. The system of claim 1, wherein the long-range antenna is configured to operate within a relatively high frequency range between 860 megahertz and 960 megahertz, wherein each of the first short-range antenna and the second short-range antenna is configured to operate within a relatively low frequency range between 125 kilohertz and 135 kilohertz.

3. The system of claim 1, wherein the second set of identifying data includes cardholder identification data.

4. The system of claim 1, wherein the second set of identifying data includes at least one of a name, a date of birth, or a username of a cardholder.

5. The system of claim 1, wherein the second set of identifying data does not include financial data.

6. The system of claim 1, wherein the third signal includes the second set of identifying data in an encrypted format.

7. The system of claim 1, wherein the first set of identifying data includes financial data.

8. The system of claim 1, wherein the second set of identifying data comprises credentials for access points to a building.

9. The system of claim 1, wherein the long-range antenna comprises an RFID antenna.

10. The system of claim 1, wherein:
at least a portion of the first integrated circuit extends to at least one of the first major surface or the second major surface so that the first integrated circuit is readable by a chip reader; and
the second integrated circuit is embedded entirely within the card.

11. The system of claim 1, wherein the second integrated circuit is part of the first integrated circuit.

12. The system of claim 1, wherein:
the first integrated circuit is powered to cause the first short-range antenna to transmit the first signal by the first interrogating electromagnetic signal received via the first short-range antenna;
the first integrated circuit is powered to cause the second short-range antenna to transmit the second signal by the second interrogating electromagnetic signal received via the second short-range antenna; and
the second integrated circuit is powered to cause the long-range antenna to transmit the third signal by the third interrogating electromagnetic signal received via the long-range antenna.

13. The system of claim 1, further comprising a switch secured to the card, wherein the first integrated circuit is configured to cause the switch to electrically couple only one of the first short-range antenna or the second short-range antenna to the first integrated circuit at a time.

14. The system of claim 1, wherein:
the first integrated circuit includes a first memory device that stores the first subset of the first set of identifying data and a second memory device that stores the second subset of the first set of identifying data, and
the second integrated circuit includes a third memory device that stores the second set of identifying data.

15. The system of claim 1, further comprising an indicating light-emitting diode (LED) secured to the card, wherein the first integrated circuit is configured to cause the LED to emit light in response to one or more of the first short-range antenna transmitting the first signal, the first short-range antenna receiving the second interrogating electromagnetic signal, or the second short-range antenna transmitting the second signal.

16. The system of claim 15, wherein the second integrated circuit is configured to cause the indicating LED to emit light in response to the long-range antenna receiving the third interrogating electromagnetic signal.

17. The system of claim 15, wherein:
the first integrated circuit is configured to cause the indicating LED to emit a first color light in response to the first short-range antenna receiving the first interrogating electromagnetic signal,
the first integrated circuit is configured to cause the indicating LED to emit a second color light in response to the second short-range antenna receiving the second interrogating electromagnetic signal, and
the second integrated circuit is configured to cause the indicating LED to emit a third color light in response to the long-range antenna receiving the third interrogating electromagnetic signal.

18. The system of claim 1, wherein, upon executing a transaction using the card, the second integrated circuit is configured to cause the long-range antenna to transmit details of the transaction to a computing device associated with a cardholder.

19. The system of claim 1, wherein:
the long-range antenna is substantially omnidirectional, and
the first and second short-range antennas are each substantially unidirectional.

20. The system of claim 1, wherein receiving the third interrogating signal comprises receiving at least one of the first or the second interrogating signals.

* * * * *